US008319887B2

(12) United States Patent
Hamada et al.

(10) Patent No.: US 8,319,887 B2
(45) Date of Patent: Nov. 27, 2012

(54) FRAME RATE CONVERSION APPARATUS FOR VIDEO SIGNAL AND DISPLAY APPARATUS

(75) Inventors: Koichi Hamada, Yokohama (JP);
Yoshiaki Mizuhashi, Yokohama (JP);
Mitsuo Nakajima, Yokohama (JP);
Masahiro Ogino, Ebina (JP)

(73) Assignee: Hitachi, Ltd., Tokyo (JP)

( * ) Notice: Subject to any disclaimer, the term of this patent is extended or adjusted under 35 U.S.C. 154(b) by 1392 days.

(21) Appl. No.: 11/949,907

(22) Filed: Dec. 4, 2007

(65) Prior Publication Data

US 2008/0129862 A1    Jun. 5, 2008

(30) Foreign Application Priority Data

Dec. 4, 2006   (JP) .................................. 2006-326447

(51) Int. Cl.
*H04N 7/01*      (2006.01)
*H04N 11/20*     (2006.01)
*H04N 11/22*     (2006.01)

(52) U.S. Cl. ......... 348/441; 348/443; 348/452; 348/456

(58) Field of Classification Search .................. 348/441, 348/443, 452, 456
See application file for complete search history.

(56) References Cited

U.S. PATENT DOCUMENTS 4,663,665 A    5/1987   Tanaka et al.
5,508,747 A    4/1996   Lee
5,546,130 A *  8/1996   Hackett et al. ................ 348/447
5,784,114 A    7/1998   Borer et al.
5,920,494 A *  7/1999   Setbacken et al. ............ 708/290
2001/0017889 A1   8/2001   Borer
2002/0141500 A1  10/2002   Briand et al.
2004/0246374 A1* 12/2004   Mishima et al. .............. 348/441

FOREIGN PATENT DOCUMENTS

| CN | 86100610 | 7/1986 |
| CN | 1117690 | 2/1996 |
| EP | 0 909 092 A2 | 4/1999 |
| EP | 1 233 618 | 8/2002 |
| GB | 2 263 602 | 7/1993 |
| JP | 11-112939 | 4/1999 |

* cited by examiner

*Primary Examiner* — Kristine Kincaid
*Assistant Examiner* — Gigi L Dubasky
(74) *Attorney, Agent, or Firm* — Antonelli, Terry, Stout & Kraus, LLP.

(57) ABSTRACT

Provided is a frame rate conversion apparatus for inputting a video signal and inserting an interpolation frame into the video signal so as to convert a frame rate of the video signal. The apparatus includes: an input unit for inputting the video signal; a video interpolation unit for generating an interpolation frame and performing an interpolation process of the video signal; and a control unit for controlling the generation process of the interpolation frame by the video interpolation unit. The video interpolation unit performs the interpolation frame generation process by using a plurality of methods, and the control unit controls switching between the plurality of interpolation frame generating methods.

1 Claim, 12 Drawing Sheets

FIG.3

| | DATA NAME | DATA TYPE | DATA CONTENT |
|---|---|---|---|
| 32 | THRESHOLD VALUE 1 | VECTOR OCCUPATION RATIO IN REGION A | 30% |
| 33 | LIMIT PERIOD 1 | SWITCHING LIMIT PERIOD | 1sec |
| 34 | JUDGMENT PERIOD 1 | JUDGMENT PERIOD | 0.3sec |
| 35 | THRESHOLD VALUE 2 | JUDGMENT PERIOD | 20% |
| 36 | ACQUISITION SIGNAL 1 | ACQUISITION SIGNAL CONDITION | SIGNAL B CONTAINED ? |
| 37 | THRESHOLD VALUE 3 | VECTOR OCCUPATION RATIO IN REGION A | PROBABILITY OF PRESENCE OF SIGNAL B IS 15% |
| | ⋮ | ⋮ | ⋮ |

(row 31: DATA NAME / DATA TYPE / DATA CONTENT header; table labeled 30)

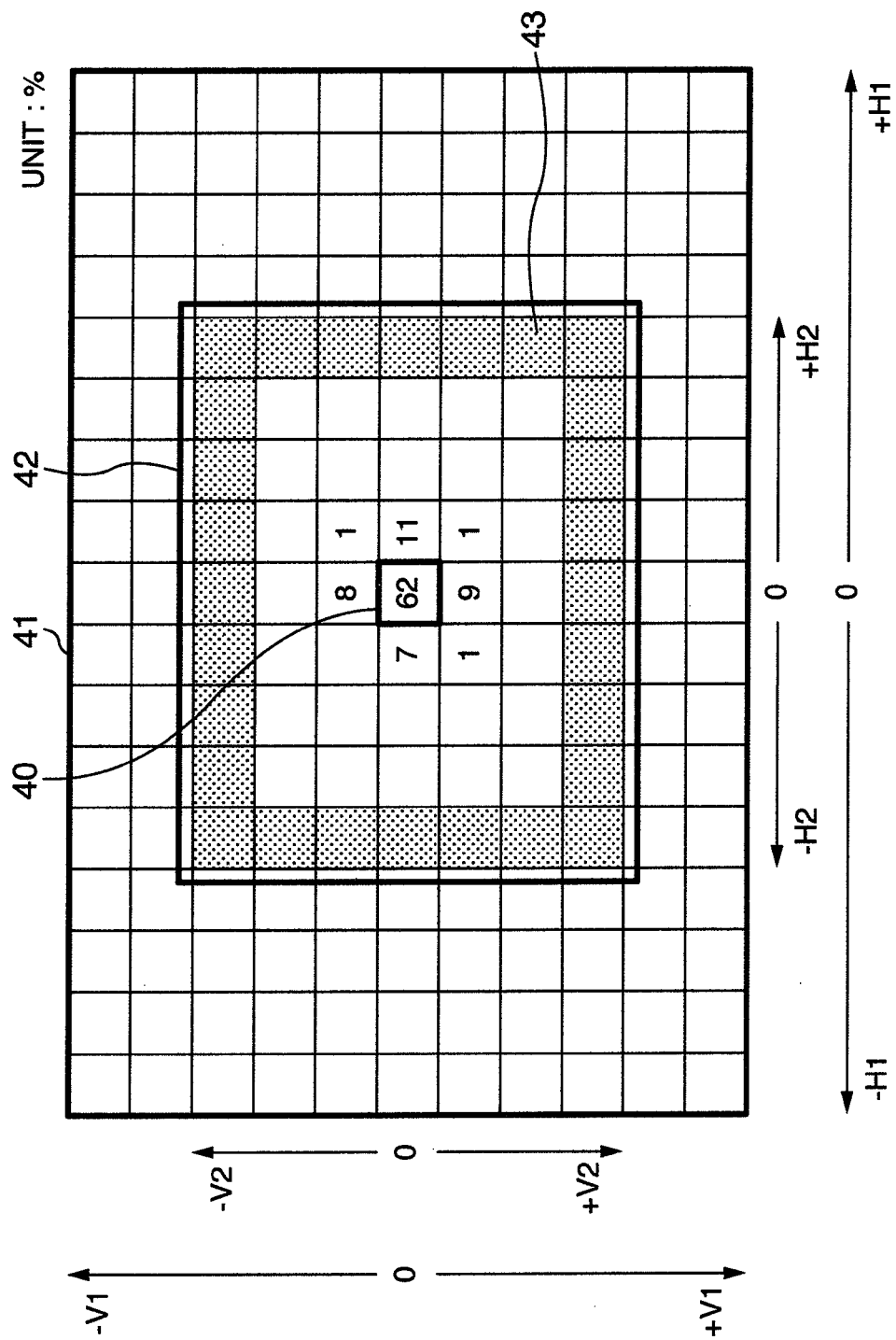

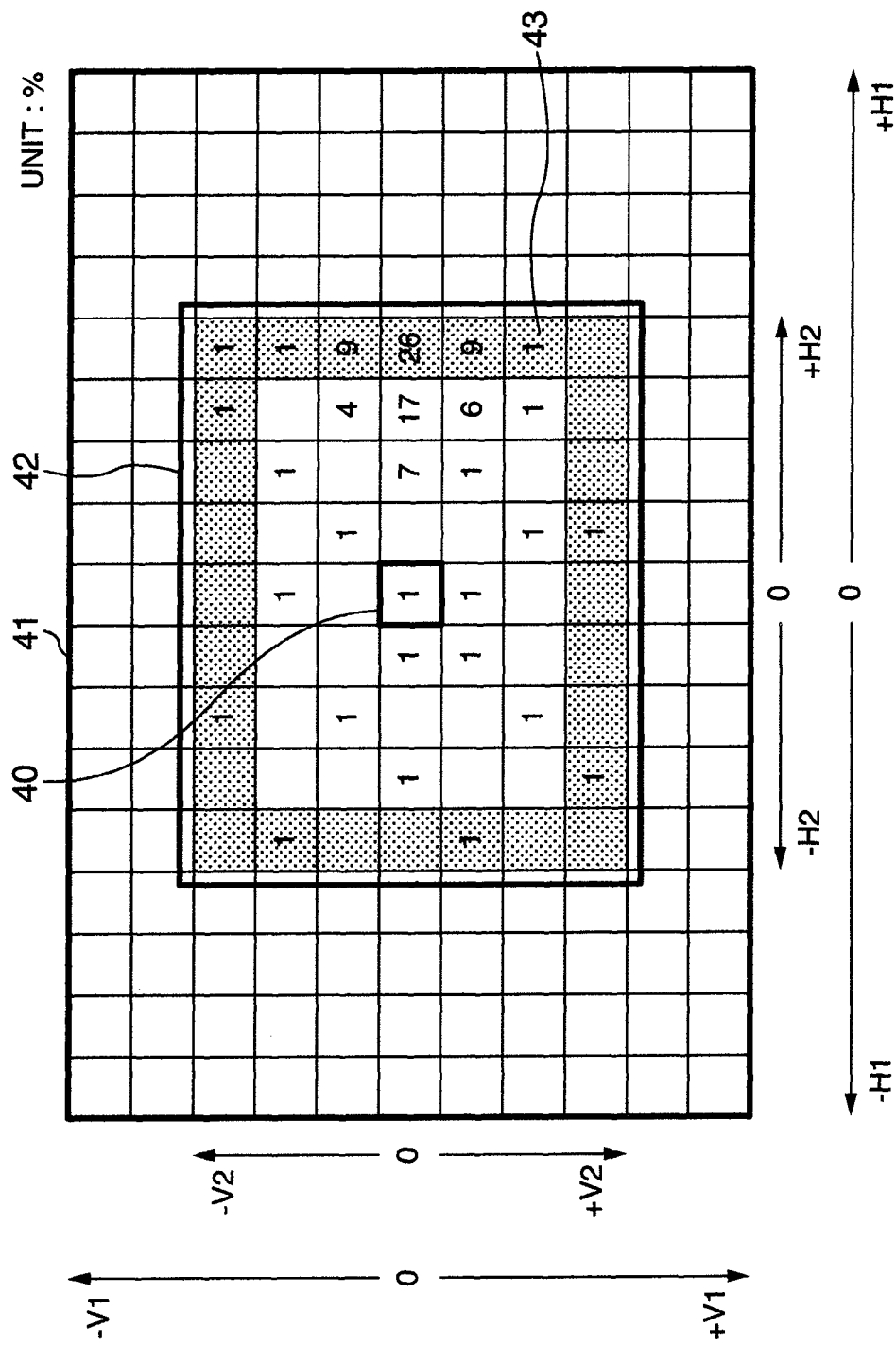

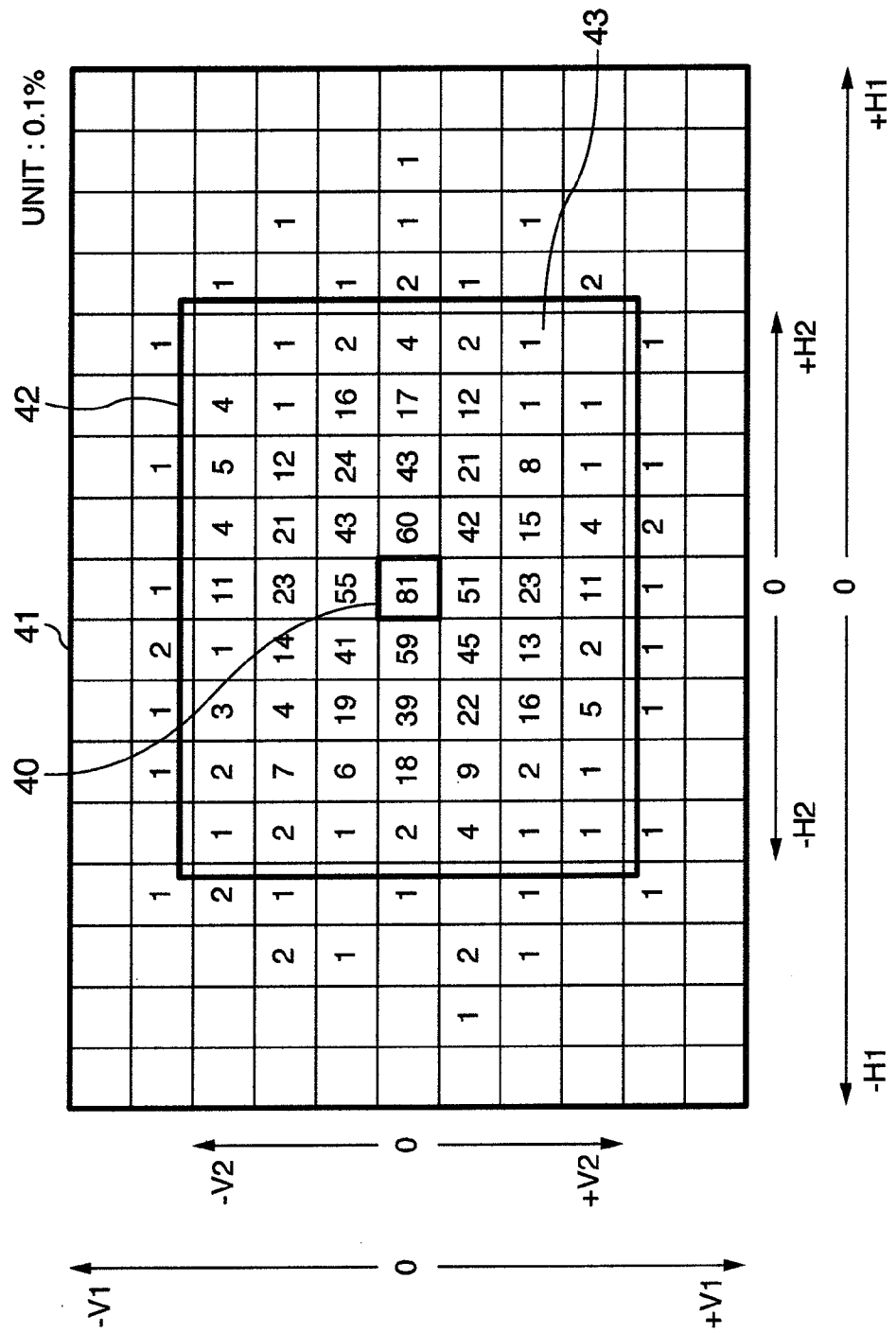

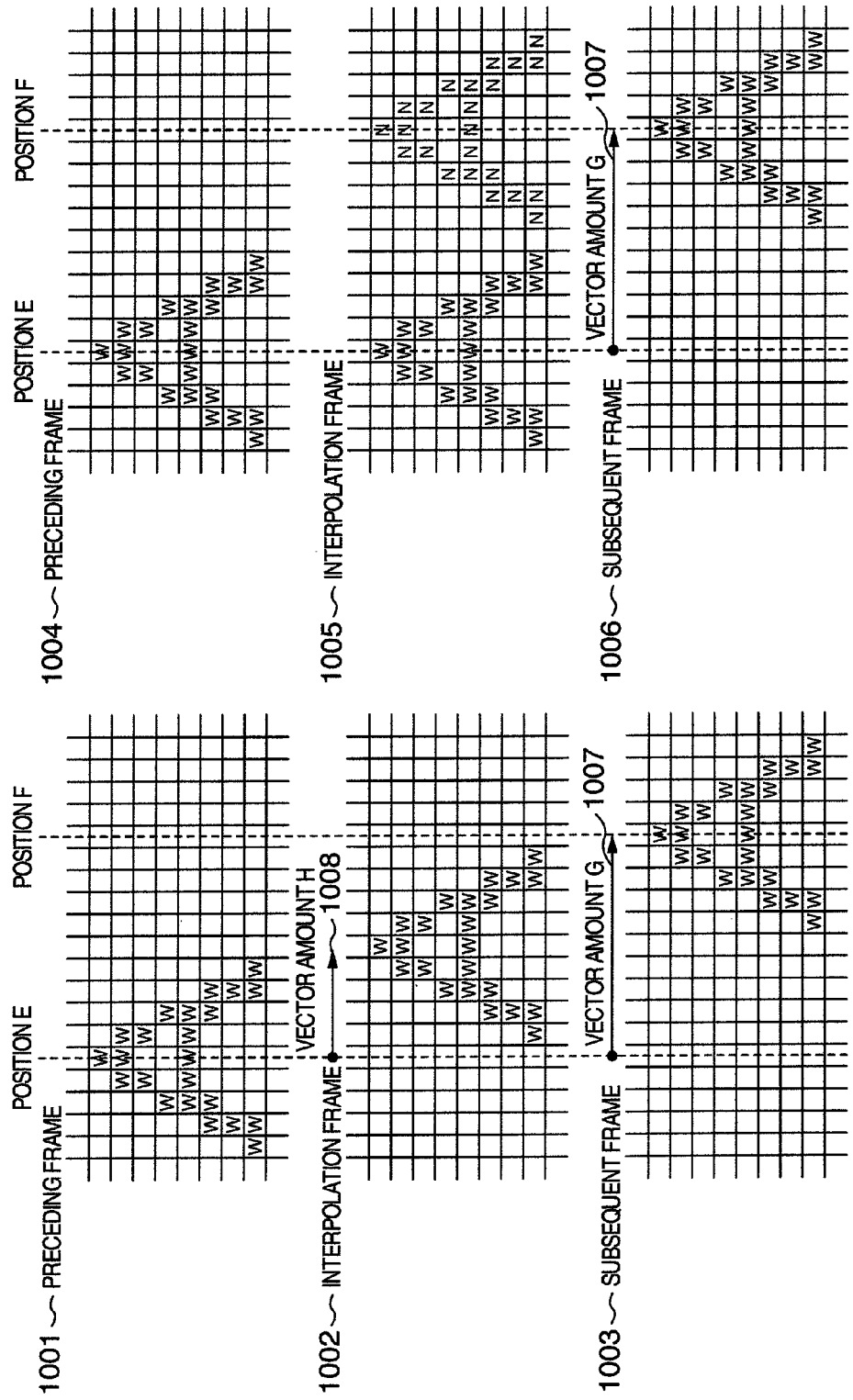

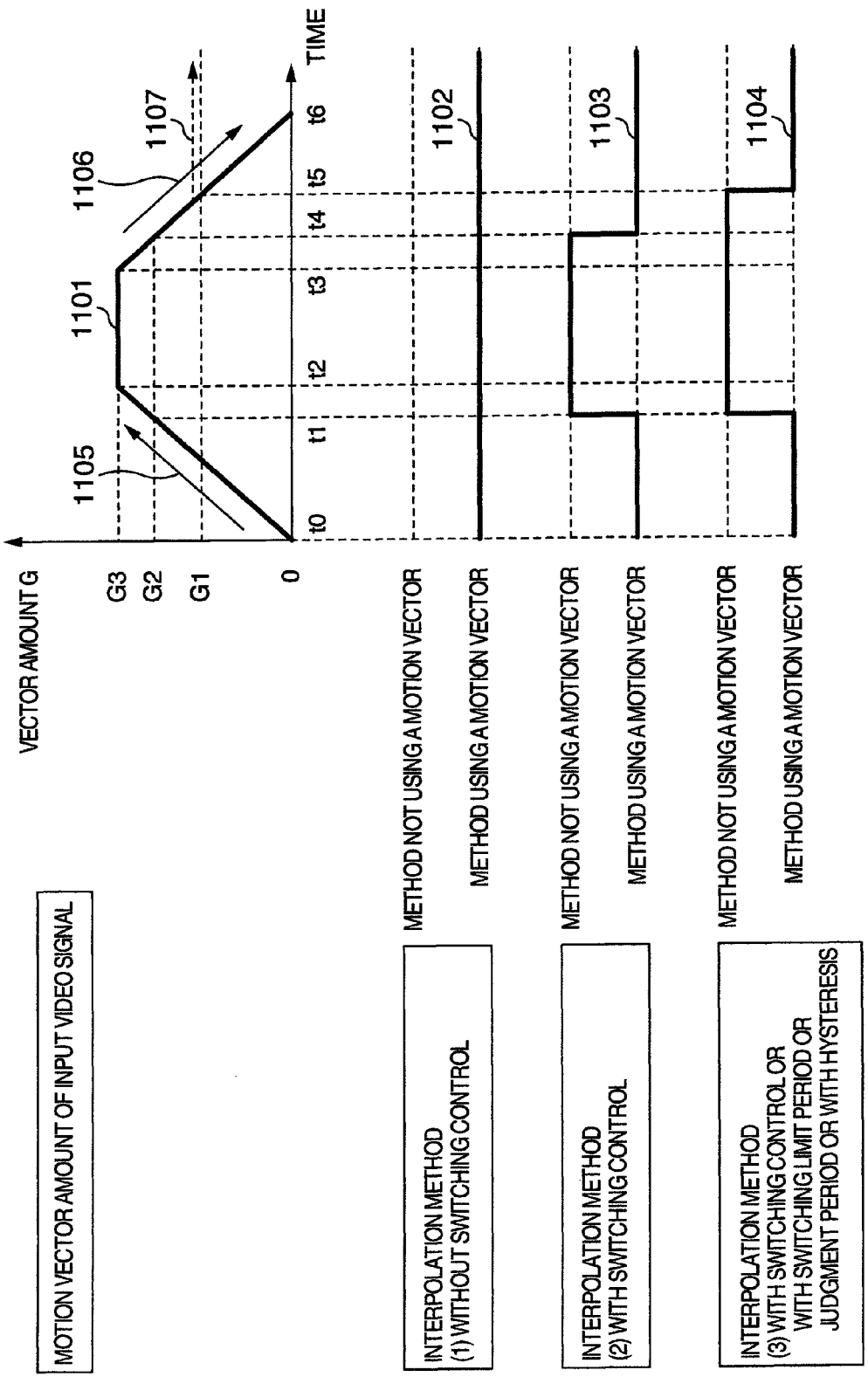

FRAME RATE CONVERSION APPARATUS FOR VIDEO SIGNAL AND DISPLAY APPARATUS

INCORPORATION BY REFERENCE

The present application claims priority from Japanese application JP2006-326447 filed on Dec. 4, 2006, the content of which is hereby incorporated by reference into this application.

BACKGROUND OF THE INVENTION

The present invention relates to a frame rate conversion technique for conversion of a video signal frame frequency (hereinafter, referred to "frame rate").

For example, EP0909092A2 and the corresponding JP-A-11-112939 disclose a technique for converting a frame rate by searching a motion vector between a plurality of frames of an input video signal, a position of an image contained in the preceding and subsequent frame image according to the searched motion vector, generating a new frame image, and inserting the new frame image between the preceding and the subsequent frame.

SUMMARY OF THE INVENTION

The frame rate conversion technique using a motion vector disclosed in EP0909092A2 and JP-A-11-112939 searches a motion vector between a plurality of frames of an input video signal and generates a new block according to the motion vector so as to generate an interpolation frame.

Here, if the search range of the motion vector for searching the motion vector is to be reduced so as to reduce the calculation process amount in searching the motion vector, the ratio of the motion vectors exceeding the search range relatively increases in the motion vectors of the input video signal. This causes a motion vector search mistake and increases the frames of the interpolation image of a low image quality, which in turn lowers the quality of video.

It is therefor an object of the present invention to reduce the calculation process amount in the frame conversion process while suppressing lowering of the image quality.

In order to achieve the aforementioned object, an embodiment of the present invention includes: an input unit for inputting the video signal, a video interpolation unit for generating an interpolation frame and performing an interpolation process of the video signal, and a control unit for controlling the generation process of the interpolation frame by the video interpolation unit, wherein the video interpolation unit performs the interpolation frame generation process by using a plurality of methods, and the control unit controls switching between the plurality of methods.

According to the present invention, it is possible to reduce the calculation process amount in the frame rate conversion process while suppressing lowering of the image quality of a video.

Other objects, features and advantages of the invention will become apparent from the following description of the embodiments of the invention taken in conjunction with the accompanying drawings.

BRIEF DESCRIPTION OF THE DRAWINGS

FIG. 3 is a table showing an example of judgment reference information according to an embodiment of the present invention.

FIG. 4A shows an example of a histogram of a motion vector according to an embodiment of the present invention.

FIG. 4C shows an example of a histogram of a motion vector according to the embodiment of the present invention.

FIG. 5 explains an example of a histogram of a motion vector according to an embodiment of the present invention.

FIGS. 10A and 10B explain an example of an input/output video according to an embodiment of the present invention.

FIG. 11 explains an example of switching control of the interpolation process method according to an embodiment of the present invention.

DESCRIPTION OF THE EMBODIMENTS

Description will now be directed to embodiments of the present invention with reference to the attached drawings.

Moreover, in the respective drawings, like components having like symbols have the same functions.

Moreover, the expressions "a frame" and "a predetermined region in a frame" in the Description and the Drawings may include meanings of "a frame image" and "an image in a predetermined region of the frame", respectively.

[Embodiment 1]

Figure 1:
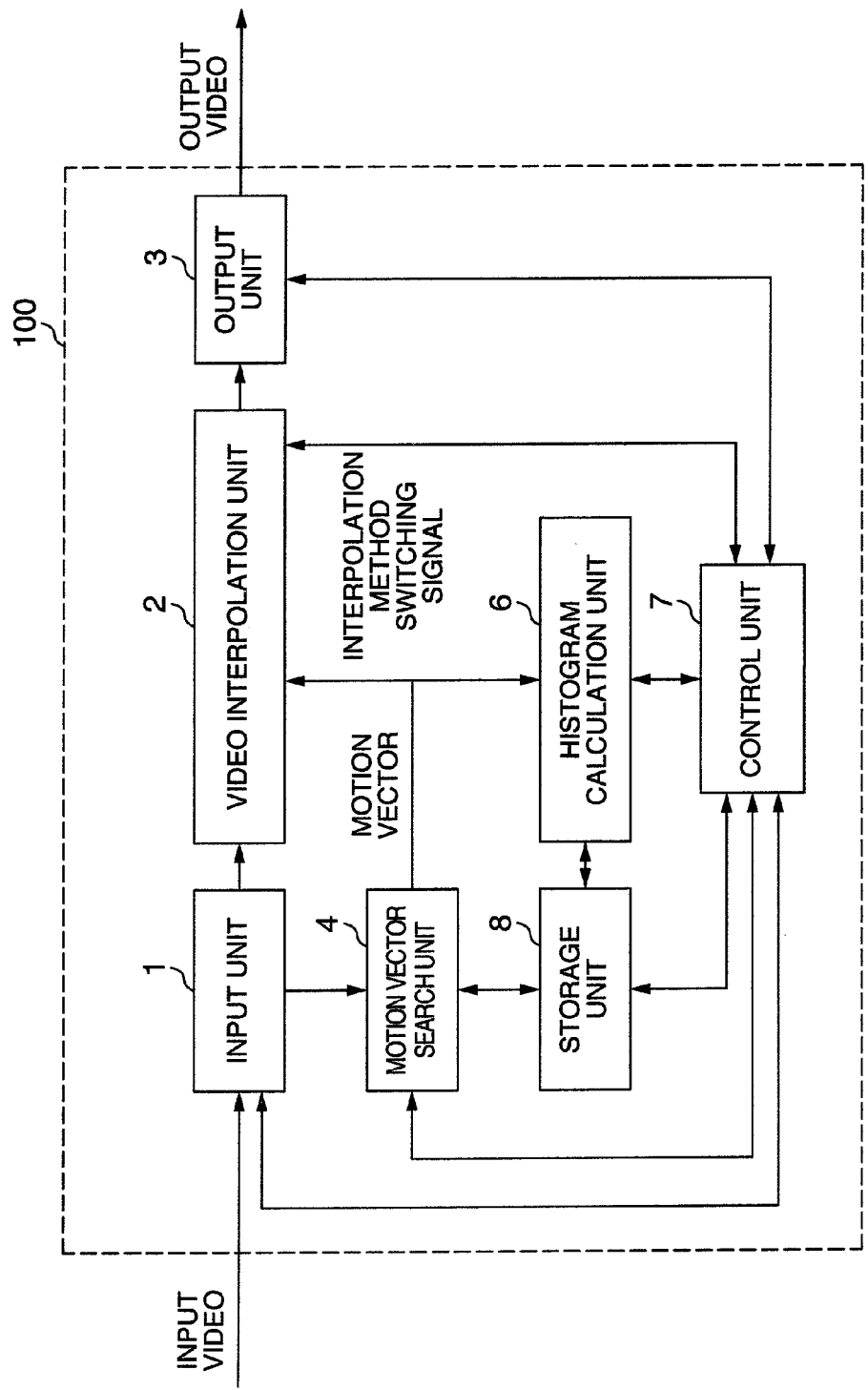
FIG. 1 is a block diagram showing an example of a frame rate conversion apparatus according to an embodiment of the present invention.

Firstly, explanation will be given on a first embodiment of the present invention with reference to the drawings. FIG. 1 shows an example of a block diagram of a motion correction type frame rate conversion apparatus 100 according to the first embodiment of the present invention.

The frame rate conversion apparatus 100, for example, includes: an input unit 1 for inputting an input video signal; a video interpolation unit 2 for changing the frame rate of the input video signal by performing an interpolation frame generation process concerning the input video signal for the input video signal by using a plurality of methods; an output unit 3 for outputting the video signal for which the frame rate has been changed, as an output video signal; a motion vector search unit 4 for searching a motion vector for the input video signal to be inputted to the input unit 1; a histogram calculation unit 6 performing a histogram calculation process on the motion vector searched by the motion vector search unit 4; a storage unit 8 for storing the motion vector searched by the motion vector search unit 4, the histogram distribution information calculated by the histogram calculation unit, and judgment reference information; and a control unit 8 for switching the method of the interpolation frame generation process of the video interpolation unit 2 by performing a judgment process by using the histogram distribution information and the judgment reference information.

Hereinafter, detailed explanation will be given on each of the components of the frame rate conversion apparatus 100.

It should be noted that the operations of the respective components of the frame rate conversion apparatus 100 may be autonomous operations of the respective components as follows. Moreover, for example, the control unit 7 may be realized by cooperating with software stored in the storage unit 8.

Firstly, an input video signal is inputted to the input unit 1. The input unit 1 transmits an input video signal to the video interpolation unit 2. The video interpolation unit 2 performs an interpolation process on the input video signal acquired from the input unit 1. Next, the video interpolation unit 2 transmits the video signal converted to a desired frame rate by performing the interpolation process, to the output unit 3. The output unit 3 outputs the video signal converted to the desired frame rate from the frame rate conversion apparatus 10.

Here, it is assumed that the interpolation process performed by the video interpolation unit 2 selectively performs a plurality of types of generation method for its interpolation frame generation method. Detailed explanation will be given later on the interpolation frame generation method or the interpolation process method performed by the video interpolation unit 2.

Next, for example, when the video interpolation unit 2 performs an interpolation process by using a motion vector, the entire region or a part of the region of at least two video frames, i.e., temporally preceding and subsequent two frames is inputted from the input unit 1 to the motion vector search unit 4.

Here, the motion vector search process by the motion vector search unit 4 is performed as follows. For example, a motion vector between video frames is searched for each block formed by a plurality of pixels or each pixel. The motion vector search method may be a known one such as the block matching and is not limited to a particular method. Next, the motion vector search unit 4 transmits the motion vector obtained by the search process, for example, to the video interpolation unit 2, the histogram calculation unit 6, the storage unit 8, and the like.

Here, in the motion vector search process by the motion vector search unit 4, the size of the range for searching a motion vector in the motion vector search object frame affects the calculation process amount of the motion vector search process. Here, in order to reduce the calculation process amount of the motion vector search process, for example, a small range may be set for searching the motion vector. However, as the motion vector search range becomes smaller, the probability of generation of a motion vector search mistake is increased. It should be noted that details on the motion vector search range and the motion vector search mistake will be given later.

Next, when the video interpolation unit 2 performs an interpolation process by the interpolation process method using a motion vector, the video interpolation unit 2 uses a motion vector acquired from the motion vector search unit 4 to perform the interpolation process of the input video signal.

Moreover, the histogram calculation unit 6 calculates a histogram distribution by counting motion vectors for each motion direction and motion amount in each screen or each predetermined region by using the motion vectors acquired from the motion vector search unit 4. For example, the histogram distribution calculation process may be performed as follows. The motion vectors acquired from the motion vector search unit 4 are stored by the histogram calculation unit 6 itself so as to calculate the histogram distribution. Moreover, it is possible to calculate the histogram distribution by using the motion vectors acquired from the motion vector search unit 4 and stored in the storage unit 8 and to store the calculated histogram information in the storage unit. In this case, the histogram calculation unit 6 need not store the information.

Next, the control unit 7 acquires the histogram distribution information calculated by the histogram calculation unit 6 from the histogram calculation unit 6 or the storage unit 8. Moreover, the control unit 7 acquires judgment reference information from the storage unit 8. Here, the control unit 7 transmits a switching instruction signal to switch the type of interpolation frame in accordance with the judgment result, to the video interpolation unit 2.

For example, the judgment reference information includes a threshold value of the number of motion vectors satisfying a predetermined condition, a threshold value of a ratio of the histogram distribution of the number of the motion vectors satisfying the predetermined condition against a modulus, and the predetermined condition (such as a predetermined motion amount condition, a predetermined direction condition, or a combination of them). Moreover, the judgment reference may be a condition capable of detecting whether the probability that the motion vector search unit 4 has made a vector search mistake is high. In this case, in accordance with the probability of generation of the motion vector search mistake, it is possible to select the interpolation frame generation process in the video interpolation unit 2. For example, when the probability of generation of the motion vector search mistake is low, it is possible to select a high-quality interpolation process method using a motion vector. Moreover, for example, when the probability of generation of the motion vector search mistake is high, it is possible to select an interpolation process method not using a motion vector. In this case, it is possible to employ a control method to prevent lowering of the interpolation frame image quality by a motion vector search mistake. It should be noted that detailed explanation on the judgment reference information and an example of the judgment process by the control unit 7 will be given later.

Next, the video interpolation unit 2 which has acquired the switching instruction signal for the interpolation process from the control unit 7 changes the interpolation process method according to the switching instruction signal.

As has been described above, the frame rate conversion apparatus 100 according to the present embodiment selects a plurality of interpolation process methods and performs an interpolation process for an input video signal and can output an output video signal having a frame rate modified by the interpolation process.

Moreover, the frame rate conversion apparatus according to the present embodiment performs a switching judgment process of a plurality of interpolation process methods by using a motion vector acquired from an input video signal and a predetermined judgment reference so as to prevent lowering of the image quality of an interpolation frame generated in the interpolation process and prevent lowering of the image quality of the output video.

Next, referring to FIG. 2A, FIG. 2B, and FIG. 2C, explanation will be given on an example of the interpolation process performed by the video interpolation unit 2 according to the first embodiment.

As has been described above, the video interpolation unit 2 performs a plurality of types of interpolation method while switching from one to another according to a switching signal from the control unit 7, for example. The video interpolation unit 2 according to the first embodiment, for example, performs three types of the interpolation frame generation method shown in FIG. 2A, FIG. 2B, and FIG. 2C.

Figure 2A:
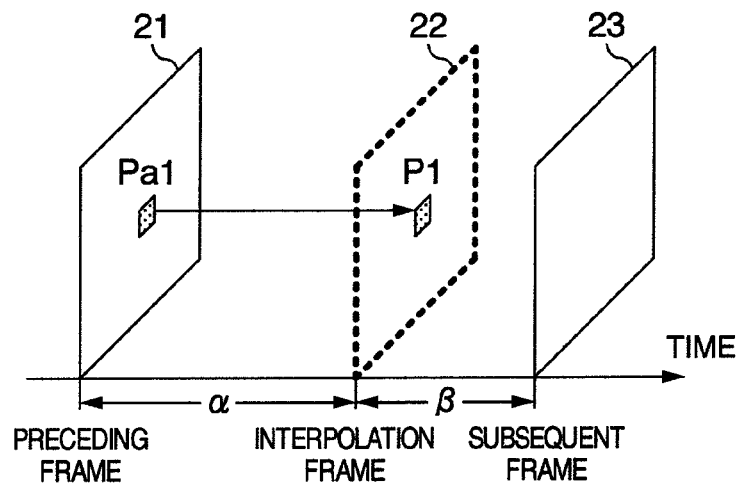
FIG. 2A explains an example of an interpolation process method according to an embodiment of the present invention.
Figure 2B:
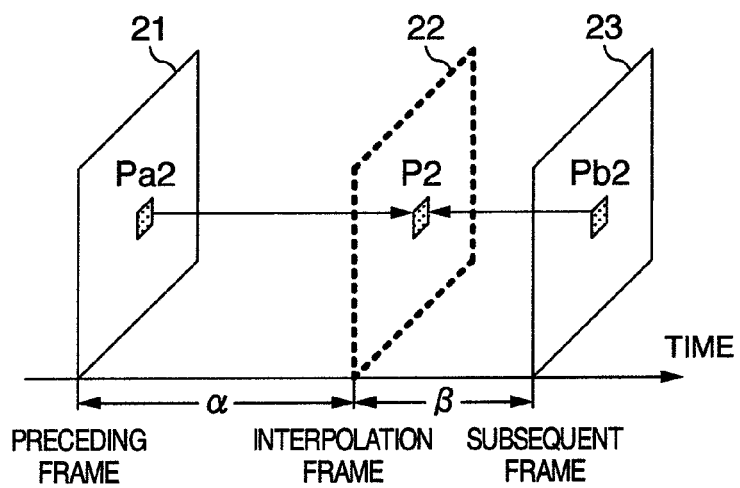
FIG. 2B explains an example of an interpolation process method according to the embodiment of the present invention.
Figure 2C:
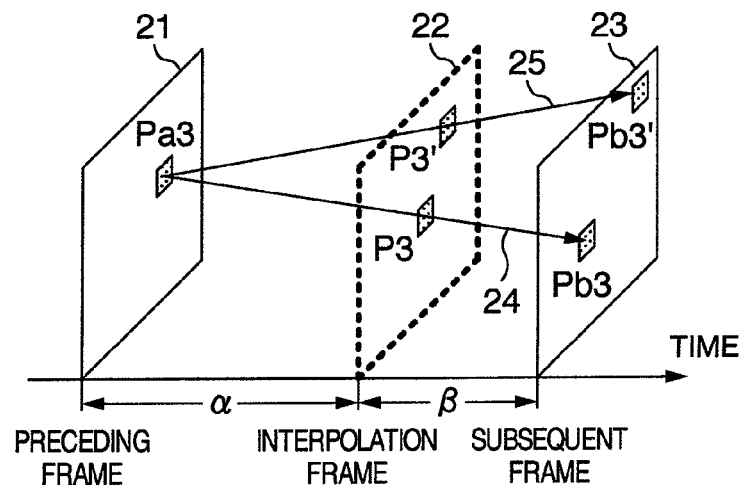
FIG. 2C explains an example of an interpolation process method according to the embodiment of the present invention.

It should be noted that the explanation on FIG. 2A, FIG. 2B, and FIG. 2C given below assumes that the interpolation process is performed in the frame unit. However, the interpolation process may also be performed in a predetermined region unit within the frame. In this case, the expression "frame" in the explanation of FIG. 2A, FIG. 2B, and FIG. 2C is simply replaced by "a predetermined region in the frame".

Firstly, referring to FIG. 2A, explanation will be given on an interpolation process method repeating a temporally preceding frame. In FIG. 2A, the horizontal axis represents time. Moreover, FIG. 2A shows a preceding frame 21 contained in the input video signal, a subsequent frame positioned temporally after the frame 21, and an interpolation frame 22 existing between the both frames and generated by the interpolation process. Moreover, α indicated on the time axis represents a time difference between the preceding frame 21 and the interpolation frame 22 and β indicated on the time axis represents a time difference between the interpolation frame 22 and the preceding frame 21. Here, in this embodiment, α and β may be set in any way.

Here, in the method for generating the interpolation frame 22 according to the present method, for example, a pixel value of the pixel P1 on the interpolation frame 22 is defined by a pixel value of the pixel Pa1 on the preceding frame 21 at the same spatial pixel position as the pixel P1 within the frame. In the same way, a pixel in the interpolation frame 22 is made to be a pixel value of the pixel positioned at the corresponding position on the preceding frame 21, thereby generating the interpolation frame 22 as the same image as the preceding frame 21. This method is characterized in that no vector search or linear interpolation process is required and the calculation amount is minimized. Moreover, this method has an advantage that the image quality is not degraded as compared to the preceding frame. However, in this method, depending on the input image, image degrading of so-called motion judder may be caused. That is, an image which should be moving while displayed appears alternately in motion and as a still image.

It should be noted that in the method of FIG. 2A, when generating a plurality of interpolation frames, like in the aforementioned example, the interpolation frames may be generated by using a pixel value on each of the interpolation frames defined by a pixel value on the preceding frame at the same spatial pixel position.

Next, referring to FIG. 2B, explanation will be given on an interpolation process method performing a linear interpolation between the temporally preceding frame and the temporally subsequent frame.

In the method for generating the interpolation frame 22 according to the present method, for example, a pixel value of a pixel P2 on the interpolation frame 22 is calculated by linear interpolation by using a pixel Pa2 on the preceding frame 21, which pixel is positioned at the same spatial pixel position as the pixel P1 in the frame and a pixel Pb2 on the subsequent frame 23, which pixel is positioned at the same spatial pixel position as the pixel P1 in the frame.

More specifically, the Expression (1) given below can be used for the calculation.

$$P2 = \frac{\beta}{\alpha + \beta} \times Pa2 + \frac{\alpha}{\alpha + \beta} \times Pb2 \quad (1)$$

Since this method does not require the motion vector search, the calculation amount can be minimized as compared to the method using the motion vector search. Moreover, as compared to the interpolation process method repeating the temporally preceding frame explained in FIG. 2A, the motion judder can be reduced and the image quality is improved.

It should be noted that when generating a plurality of interpolation frames in the method of FIG. 2B, like in the aforementioned example, a pixel value of a pixel on each of the interpolation frames may be generated by using a pixel value at the same spatial pixel position on the preceding frame and a pixel value at the same spatial pixel position on the subsequent frame.

Next, referring to FIG. 2C, explanation will be given on an interpolation process method using a motion vector.

In the method for generating the interpolation frame 22 according to this method, for example, when calculating a pixel value of a pixel P3 on the interpolation frame 22, the video interpolation unit 2, for example, uses a motion vector acquired from the motion vector search unit 4 of FIG. 1. Among the motion vectors searched by the motion vector search unit 4, for example, the vector used in this case has a start point on the preceding frame 21 temporally preceding the interpolation frame 22 and an end point on the subsequent frame 23 temporally subsequent to the interpolation frame 22, and passes through the pixel P3. In FIG. 2C, the motion vector is indicated as a motion vector 24.

Here, In the interpolation process by the present method, the pixel value of the pixel P3 on the interpolation frame 22 is calculated, for example, by using the pixel value of the pixel Pa3 as the start point of the motion vector 24 and the pixel value of the pixel Pb3 as the end point of the motion vector 24. For example, the pixel value of the pixel Pa3 may be directly used as the pixel value of the pixel P3. Moreover, the pixel value of the pixel P3 may be calculated by replacing "P2" by "P3", "Pa2" by "Pa3", and "Pb2" by "Pb3" in Expression (1).

The method of FIG. 2C requires the motion vector search which requires a greater calculation amount than in the method of FIG. 2A and in the method of FIG. 2B. However, since the motion vector is used, it is possible to perform an interpolation process based on the motion of the image between the frames. In this case, as compared to the method of FIG. 2B, the blur of a moving object is reduced and the dynamic image quality is improved. Moreover, the motion judder can be reduced.

Next, explanation will be given on the case when the method of FIG. 2C is used upon occurrence of a motion vector search mistake in the motion vector search unit 4. The motion vector 25 of FIG. 2C indicates an erroneous motion vector caused by a motion vector search mistake of the motion vector search unit 4. Here, when a pixel value of the pixel P3' is decided in generation of the interpolation frame 23, the erroneous motion vector 25 is used. However, the pixel value of the pixel Pa3 does not pass through the spatial pixel point of the pixel P3' at the moment of the interpolation frame 23. Accordingly, the pixel value of the pixel P3' will not be a pixel value in accordance with the motion of the image to the preceding frame 21 or to the subsequent frame 23 even when the pixel value of the pixel P3' is calculated by the using Pa3 which is the start point of the motion vector 25 or by using the pixel value of Pa3 which is the start point of the motion vector 25 and the pixel value of Pb3' which is the end point of the motion vector 25.

Consequently, when such a motion vector search mistake has occurred, the image quality of the interpolation frame is degraded.

The video interpolation unit 2 according to the present embodiment can appropriately obtain both of the advantage to achieve a high image quality and the advantage to reduce the calculation amount by selectively switching between the interpolation methods of FIG. 2A, FIG. 2B, and FIG. 2C.

Next, referring to FIG. 3, explanation will be given on an example of the judgment reference information used by the control unit 7 of the present embodiment to switch the interpolation process method performed by the video interpolation unit 2.

FIG. 3 shows the judgement reference information 30.

The judgment reference information 30 may be stored, for example, in the storage unit 8 in FIG. 1. The control unit 7 acquires necessary information contained in the judgment reference information 30.

It should be noted that the judgment reference information 30 shown in FIG. 3 is only an example and may hold the content of the judgment reference information already explained in addition to the content shown in FIG. 3.

FIG. 3 shows respective information pieces contained in the judgment reference information 30 in a matrix state for explanation. Among them, for explanation, row 31 indicates item names of data in respective columns. The data contains row 32, row 33, row 34, row 35, row 36, row 37, and the like.

For example, the data stored in row 32 has a data name "threshold value 1", a data type "vector occupation ratio in region A", and a content "30%". The judgment process using the data will be detailed later.

Moreover, for example, the data stored in row 33 has a data name "limit period 1", a data type "switching limit period", and a content "1 sec". The data is, for example, limit period data for limiting the switching process of the interpolation process by a predetermined period of time. The judgment process using the data will be detailed later.

Moreover, for example, the data stored in row 34 has a data name "judgment period 1", a data type "judgment period", and a content "0.3 sec". The data is on a predetermined period used, for example, for judging the switching process of the interpolation process. The judgment process using the data will be detailed later.

Moreover, for example, the data stored in row 35 has a data name "threshold value 2", a data type "vector occupation ratio in region A", and a content "20%". The data is on a threshold value like "threshold value 1". The judgment process using the data will be detailed later.

Moreover, for example, the data stored in row 36 has a data name "acquisition signal 1", a data type "acquisition signal condition", and a content "signal B contained". The data is, for example, a judgment reference condition of the switching process of the interpolation process and indicates that a switching process is executed if the input video signal contains the signal B. The judgment process using the data will be detailed later.

Moreover, for example, the data stored in row 37 has a data name "threshold value 2", a data type "vector occupation ratio in region A", and a content "15%". The data is, for example, a combination of a judgment condition of a signal contained in the input video signal and a condition of threshold value data using the number of motion vectors. The judgment process using the data will be detailed later.

The control unit 7 according to the first embodiment of the present invention acquires necessary information from the judgment reference information 30 explained above, judges whether to switch the interpolation process method, and transmits a switching signal of the interpolation process method to the video interpolation unit 2. Thus, the video interpolation unit 2 according to the first embodiment of the present invention can realize switching of an appropriate interpolation process method according to various conditions.

Next, referring to FIGS. 4A, 4B, and 4C, explanation will be given on how the control unit 7 according to the first embodiment of the present invention executes the interpolation process switching judgment process by using the motion vector acquired by the motion vector search unit 4.

Figure 4B:
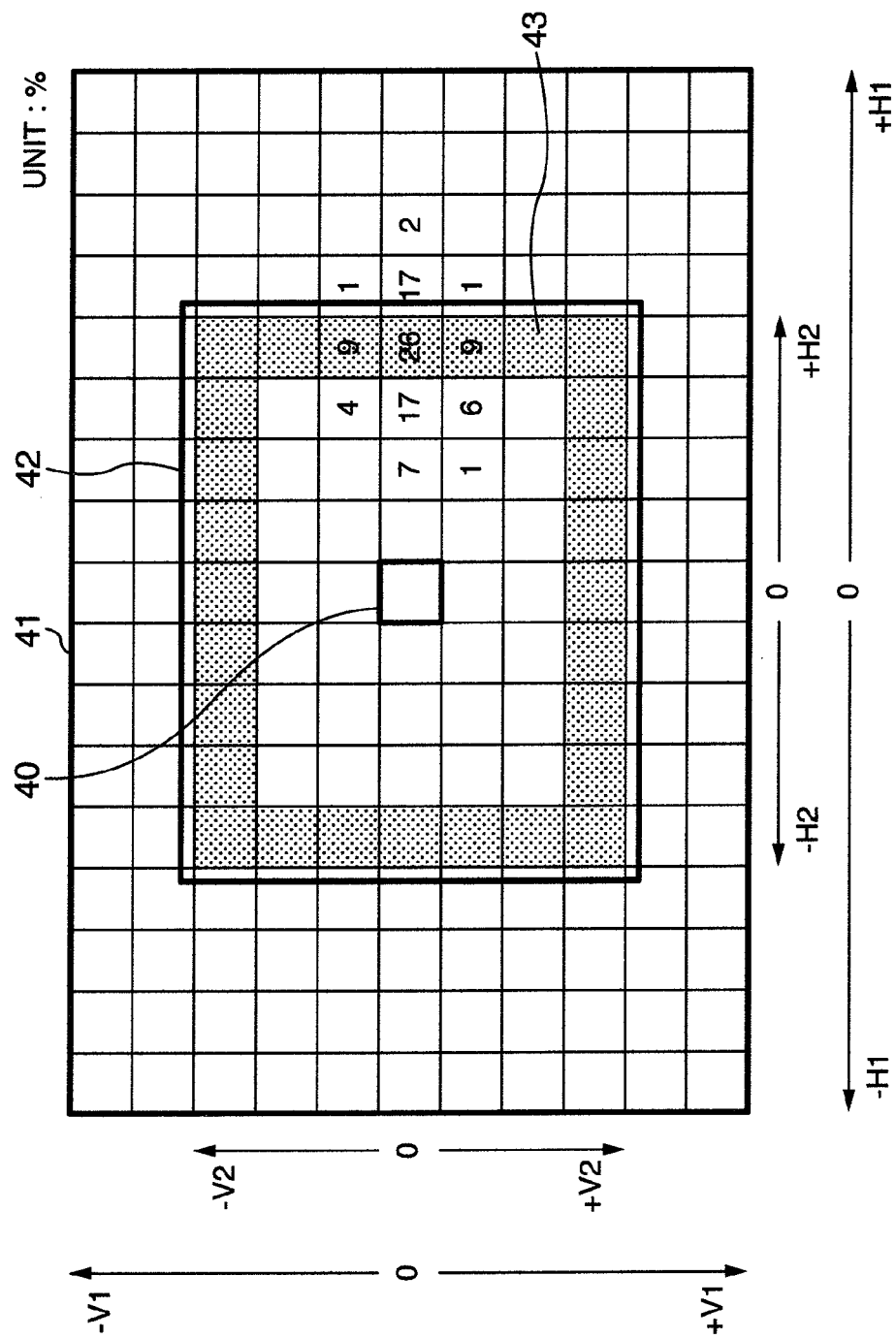
FIG. 4B shows an example of a histogram of a motion vector according to the embodiment of the present invention.

FIGS. 4A, 4B, and 4C show an example of a motion vector histogram distribution used by the control unit 7 according to the first embodiment of the present invention for the switching judgment process of the interpolation process. A range 41 and a range 42 shown in FIGS. 4A to 4C show the motion vector search range in the motion vector search unit 4 in a matrix based on the pixel unit. A pixel 40 is the origin pixel. Moreover, H1 and V1 indicate the number of pixels from the center pixel of the search range 41 in the horizontal direction and the vertical direction, respectively. Moreover, H2 and V2 indicate the number of pixels from the center pixel of the search range 42 in the horizontal direction and the vertical direction, respectively. Here, the two search ranges, i.e., the search range 41 and the search range 42 are shown for explaining the following characteristic concerning the respective search ranges. That is, the first search range 41 has a large search range and a motion vector search mistake hardly occurs but requires a large calculation amount for searching the motion vector. The second search range 42 has a small search range and requires a small calculation amount but the probability that a motion vector search mistake occurs is increased.

Moreover, a region 43 is a region having a an external predetermined width within the search range 42. The region 43 in FIGS. 4A to 4C is a region having a width of one pixel and expressed as a dotted region. For example, the width of the region may be one pixel or three pixels. Moreover, the width may be changed depending on the position. The region only should be in the search range near the external side.

Next, explanation will be given on values indicated in each pixel in FIGS. 4A to 4C. The vector used by the control unit 7 for performing the switching judgment process is, for example, a motion vector passing through the entire interpolation frame or a pixel within a predetermined region of the interpolation frame among the motion vectors acquired by the motion vector search unit 4. That is, for example, in FIG. 2C, among the motion vectors having a start point on the preceding frame 21 and an end point on the subsequent frame 23, it is possible to use the vector passing through the entire interpolation frame 22 or a pixel within a predetermined region of the interpolation frame 22. The predetermined region on the preceding frame 21, the subsequent frame 23, and the interpolation frame 22 may be appropriately selected according to design. Herein below, explanation will be given on a case of the motion vector passing through the entire interpolation frame 22. When using a vector passing through a predetermined region of the interpolation frame 22, what is required is to replace the expression "the entire interpolation frame 22" by "a pixel within a predetermined region on the interpolation frame 22" in the explanation below.

Here, FIG. 4A shows a histogram distribution. That is, when respective start points passing through the entire interpolation frame 22 (actually the motion vector start points are on the preceding frame 21) are arranged as the origin pixel 40 in the search range of FIG. 4, the value obtained by dividing the number of motion vectors having the respective pixel positions as the end positions by the number of motion vectors passing through the entire interpolation frame is shown in percentage.

The histogram distribution calculation process may be performed by the histogram calculation unit 6 by using, for example, the motion vectors searched by the motion vector search unit 4 and stored in the storage unit 8.

The histogram distribution shown in FIG. 4A, for example, shows a case when a video having little motion is inputted as an input video signal into the frame conversion apparatus. That is, the motion vector histogram distribution exists only near the origin pixel and the histogram distributes within a range fully contained in the search range 41 and the search range 42. In this case, the same result can be obtained when the motion vector search unit performs the motion vector search by using the search range 41 or the search range 42. Moreover, no motion vector search mistake occurs.

Next, FIG. 4B shows a motion vector histogram in one interpolation frame when a video having a plenty of motions is inputted as an input video signal and the motion vector search unit 4 performs motion search by using the search range 41. In this case, the histogram distributes apart from the origin pixel 40 as shown in FIG. 4B. In the example of FIG. 4B, the video of the input video signal is a video moving toward the rear right. Here, the histogram distribution in FIG. 4B is within the range of the search range 41 but partially distributes out of the search range 42. Accordingly, when the motion vector search is performed for the input video signal by using the search range 42, a motion vector search mistake occurs for the motion vector belonging to the distribution out of the search range 42. This case is shown in FIG. 4C.

FIG. 4C is a motion vector histogram in the same interpolation frame when the same input video signal as FIG. 4B is inputted and the motion vector search unit 4 performs a motion search by using the search range 42. Here, comparison is made between the histogram of FIG. 4B and the histogram of FIG. 4C. Firstly, in FIG. 4B, the motion vector distributing out of the search range 42 distributes as a motion vector search mistake within the search range 42. Here, if the video interpolation unit 2 performs the interpolation process shown in FIG. 2C by using the motion vector which the motion vector search unit 4 has acquired by searching the motion vector, the image quality of the interpolation frame is lowered by the number of occurrences of the motion vector search mistake.

Here, if the histogram distributions of FIG. 4B and FIG. 4C are compared to the relationship between the search ranges 41 and 42, the following can be said. That is, in order to prevent degradation of an image quality of the interpolation frame in a video interpolation process having a plenty of motions, it is possible to enlarge the motion vector search range so as to reduce the motion vector search mistakes. However, when the search range is increased, the calculation amount concerning the motion vector search is also increased.

Accordingly, in order to eliminate the trade-off and simultaneously reduce the calculation amount and prevent lowering of an image quality of the interpolation frame, the frame rate conversion apparatus performs a process as follows. That is, for example, the motion vector search unit 4 performs a motion vector search process within a narrower search range than in the conventional method like the search range 40. Here, the video interpolation unit 2 generates an interpolation frame of a higher image quality by using the interpolation method using the motion vector shown in FIG. 2C. Next, when a video having a plenty of the motions as shown in FIG. 4C is inputted as the input video signal, the control unit 7 detects that a video having a plenty of motions has been inputted, by using the histogram calculated by the histogram calculation unit 6. Next, the control unit 7 transmits to the video interpolation unit, an interpolation process method switching signal for switching the interpolation method to be performed by the interpolation process unit 2 from the method of FIG. 2C using the motion vector to the interpolation process method of FIG. 2B not using any motion vector. The video interpolation unit 2 which has acquired the interpolation process method switching signal switches the interpolation method from the method of FIG. 2C to the method of FIG. 2B or FIG. 2A.

When the aforementioned interpolation process is performed, for example, by using a narrower range requiring a smaller calculation amount than in the conventional method, it is possible to prevent the affect from lowering of the image quality of the interpolation frame caused by a motion vector search mistake even if a video having a plenty of motions is inputted.

Lowering of the image quality caused when the method of FIG. 2C is switched to the method of FIG. 2B is not so significant as compared to lowering of the interpolation frame image quality caused by a search mistake. Accordingly, it is possible to prevent lowering of the image quality in the output video signal after the interpolation process.

Referring to FIG. 4A and FIG. 4C, detailed explanation will be given on the method for detecting that a video having a plenty of motions has been inputted in the judgment process in the frame rate conversion apparatus according to the present embodiment. That is, in the histogram distributions shown in FIG. 4A and FIG. 4C, the control unit 7 according to the present embodiment treats the ratio of the total of the distribution contained in the region 43 against the entire histogram distribution as a judgment parameter. For example, in FIG. 4A, the total of the histogram distribution contained in the region 43 is 0% and the judgment parameter is 8%. Next, for example, in FIG. 4C, the total of the histogram distribution contained in the region 43 is 9+26+9+(1×9)=53% and the judgment parameter is 53%. That is, when a video having a plenty of motions is inputted and a motion vector search mistake occurs, the ratio of the histogram distributing in the region around the motion vector search range against the entire histogram distribution becomes high.

Here, the control unit 7 compares the judgment parameter to the threshold value contained in the judgment reference information 30 stored in the storage unit 8 so as to perform a judgment process. That is, the data "threshold value 1" contained in row 32 of the judgment reference information 30 shown in FIG. 3 indicates that the threshold value is contained. The data type "the vector occupation ratio in the region A" in row 32 is, for example, the aforementioned judgment parameter which is the ratio of the histogram distribution contained in the region 43 against the entire histogram distribution. Here, the data content stored in row 32 is the threshold value when the vector occupation ratio is a parameter and the value is "30%".

Accordingly, the control unit 8 compares the aforementioned judgment parameter to the threshold value. That is, if the judgment parameter is lower than 30%, the video interpolation unit 2 performs control so as to execute the interpolation process method shown in FIG. 2C. For example, in case of FIG. 4A, the judgment parameter is 0% which is lower than 30%. That is, when the judgment parameter has become 30% or above, control is performed so that the interpolation process switching signal is sent to the video interpolation unit 2 and the video interpolation unit 2 performs the interpolation process method shown in FIG. 2B or FIG. 2C. For example, in case of FIG. 4, the judgment parameter is 53%, which is higher than 30%.

Next, explanation will be given on the advantages obtained by the switching process according to the present embodiment. The histogram distributions shown in FIGS. 4A to 4C are obtained by calculation using a motion vector concerning one interpolation frame. As compared to this, the histogram distribution shown in FIG. 5 relates to not only one interpolation frame but a plenty of interpolation frames generated by general input video signals. The histogram distribution uses the search range 41 to search a motion vector and calculate the histogram distribution and indicates it as a ratio of the motion vector against a modulus. The unit of each value is 0.1%. It should be noted that in FIG. 5, pixels and the ranges indicated by the same symbols as those in FIG. 4 indicate the same ones. Their explanations are omitted.

As shown in FIG. 5, even in the histogram made by inputting an input video signal having a scene of many motions mixed with a scene of few motions, in the long-term statistic data, the distribution is concentrated at the central pixel 40 as the center of the distribution.

Here, in the example of FIG. 5, if the search range is assumed to be the search range 42, for example, the histogram distribution outside the search range 42 is several percents. As compared to this, the area within the search range 41 and outside search range 42 is, for example, nearly twice much.

Accordingly, the calculation process within the search range 41 and outside the search range 42 has a low efficiency. In particular, when the switching control of the interpolation process method of the present embodiment is not performed, the search range should be set to a greater range with a margin so as to prevent occurrence of a motion vector search mistake. Consequently, the calculation process efficiency is further lowered.

Here, the motion vector search unit 4 of the present embodiment narrows the motion vector search range, for example, to the search range 42 so as to reduce the calculation amount. In addition to this, the control unit 7 performs the aforementioned interpolation process method switching process for the interpolation frame having a plenty of vector search mistakes corresponding to a portion outside the search range 42. Thus, by switching to the interpolation process method not using a motion vector, it is possible to prevent lowering of the frame image quality.

Accordingly, in the examples of the aforementioned FIGS. 4A to 4C and FIG. 5, the calculation amount is reduced to about ⅓ while preventing lowering of the image quality.

Moreover, the motion vector search range may be set by using a histogram statistically calculated like in FIG. 5 and is not limited to the search range 42. The range may be set with consideration on other processes.

Moreover, the region 43 shown in FIGS. 4A to 4C and FIG. 5 may not be a region based on a pixel unit. For example, instead of the region 43, it is possible to set the region as a vector condition of a predetermined amount having a predetermined direction and store the condition in the storage unit 8.

Moreover, the respective search ranges, the regions, the motion vector histogram distributions shown in FIGS. 4A to 4C and FIG. 5 are only examples for explanation and they can be set according to a requirement.

Moreover, the motion vector histogram distributions shown in FIGS. 4A to 4C and FIG. 5 are based on the motion vector passing through whole or a predetermined region of the frame 22 of FIG. 2C. However, if necessary, it is possible to add a limit that the motion vector start point should be in a predetermined region of the preceding frame 22. For example, it is possible to use any histogram calculated from a motion vector used for the interpolation process.

Moreover, the judgment parameter in FIG. 4C and the threshold value 1 of the judgment reference information 30 in FIG. 3 are judged by using the motion vector histogram distribution occupation ratio in the region 43 in one interpolation frame. Here, for example, the judgment parameter and the threshold value may be a difference in the motion vector histogram distribution occupation ratio in the region 43. For example, the judgment parameter may be the difference of the occupation ratio between the interpolation frames. In this case, the increase/decrease of the image motion amount between the frames may be used as the reference. If it is assumed that the subsequent interpolation frame of the interpolation frame of FIG. 4A is FIG. 4C, the difference between the judgment parameters of them is 53%−0%=53%. Here, if the threshold value for the difference is also 30% like the threshold value 1 contained in the judgment reference information 30 in FIG. 3, 53% is not smaller than 0%. Accordingly, like the case of the parameter using the absolute value of the occupation ratio, the interpolation process method is switched in the interpolation frame of FIG. 4C.

By using the interpolation process switching judgment process using the motion vector histogram distribution explained above, it is possible to reduce the motion vector search range and the calculation process amount. Simultaneously with this, it is possible to prevent lowering of the image quality caused by a motion vector search mistake.

Accordingly, in the first embodiment of the present invention, it is possible to reduce the calculation process amount in the frame rate conversion process while suppressing lowering of the video image quality.

[Embodiment 2]

Next, explanation will be given on a second embodiment of the present invention with reference to the drawings. The frame rate conversion apparatus according to the second embodiment is identical to the frame rate conversion apparatus according to the first embodiment except for that a predetermined period is set for the switching limit period concerning the switching judgment process or the judgment process performed by the control unit 7. Alternatively, in the frame rate conversion apparatus of FIG. 1, the judgment process of the control unit 7 in the second embodiment has a hysteresis.

Figure 6:
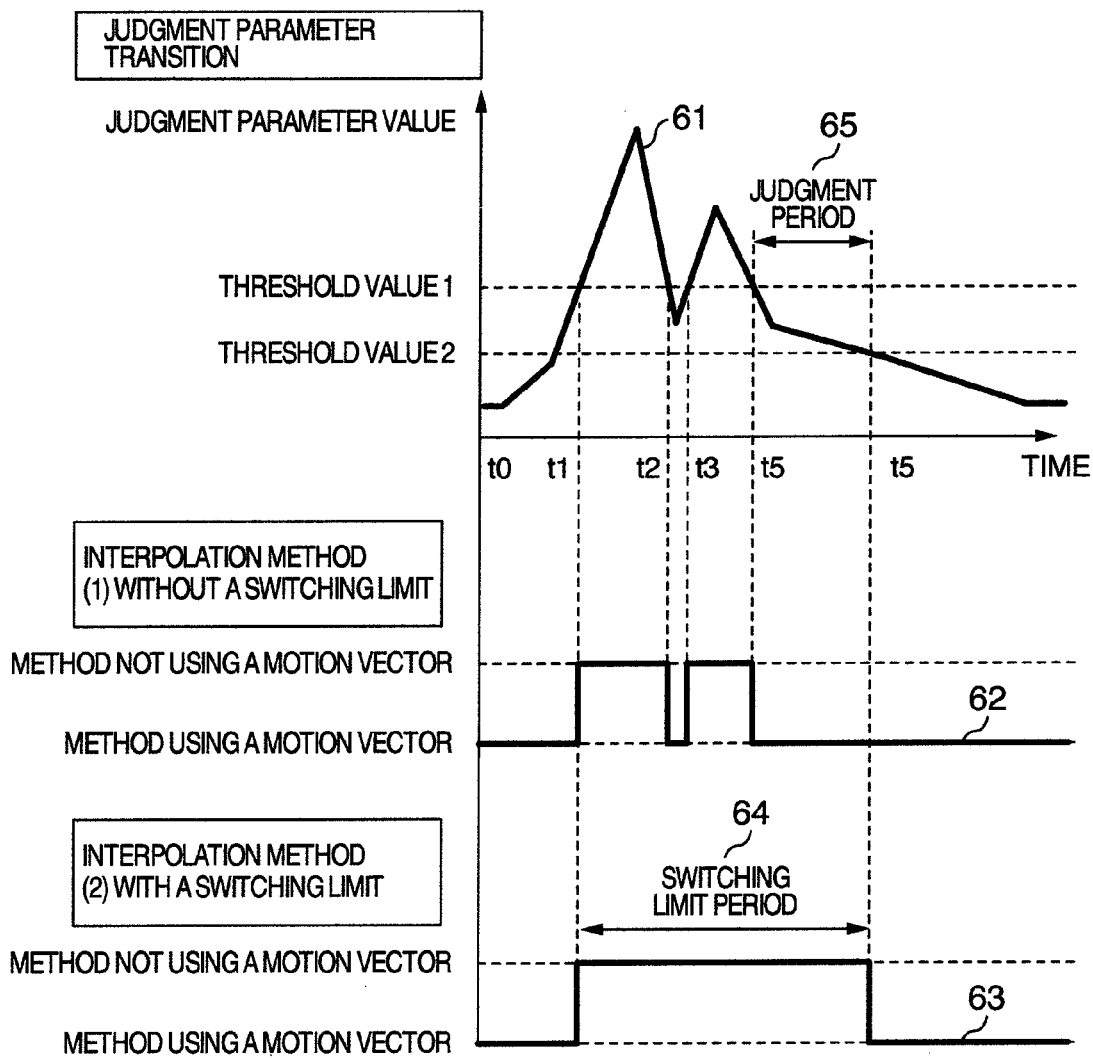
FIG. 6 explains an example of switching judgment of the interpolation process method according to an embodiment of the present invention.

Referring to FIG. 6, explanation will be given on an example of the judgment process. The graph shown at the top indicates a temporal transition 61 of the judgment parameter value explained in the first embodiment. As has been explained in the first embodiment, as the value increases, the interpolation process of video having a greater amount of motions is performed. The graphs shown at the intermediate position and at the bottom indicate transitions 62, 63 indicating the interpolation process method of the frame rate conversion apparatus on the same time axis as the transition 61 of the judgment parameter.

Here, in FIG. 6, for example, the judgment parameter transition 61 indicates the judgment parameter calculated by the control unit 7 from the histogram distribution generated by the histogram calculation unit 6.

Moreover, the interpolation process method transitions 62, 63 are obtained by control of the switching process performed by the control unit 7 on the video interpolation unit.

The interpolation process method transition 62 shows a case when the control unit does not set a predetermined limit period for the switching. The switching process is, in principle, performed by comparing the judgment parameter to the threshold value 1 depicted. The threshold value 1 is identical to "the threshold 1" in the first embodiment. For example, if the judgment parameter value is smaller than 1, the control unit 7, in principle, selects the interpolation process method using a motion vector as the interpolation process method. Moreover, for example, if the judgment parameter value is greater than 1, the control unit 7, in principle, selects the interpolation process method not using a motion vector as the interpolation process method.

The interpolation process method transition 63 indicates a case when the control unit sets a predetermined limit period for the switching. In this case, in addition to the switching based on the principle, for example, the control unit may set a predetermined limit period for the switching as an exception. Alternatively, the control unit may set a predetermined judgment period for the switching judgment as an exception.

Hereinafter, explanation will be given on the case when the control unit 7 sets a predetermined limit period for the switching and the case when the control unit 7 does not set it.

Firstly, explanation will be given in time series on the case when the control unit does not set a predetermined limit period for the switching, by using the judgment parameter transition 61 and the interpolation process method transition 62 of FIG. 6. Firstly, from time t0 to time t1, the judgment parameter value is smaller than the threshold value 1. Accordingly, the control unit 7 selects the interpolation process method using a motion vector as the interpolation process method. Next, at time t1, the judgment parameter value exceeds the threshold value 1. Accordingly, the control unit 7 selects the interpolation process method not using a motion vector as the interpolation process method and transmits an interpolation process switching signal to the video interpolation unit 2. Next, at time t2, the judgment parameter value becomes smaller than the threshold value 1. Accordingly, the control unit 7 selects the interpolation process method using a motion vector as the interpolation process method and transmits the interpolation process switching signal to the video interpolation unit 2. Next, at time t3, the judgment parameter exceeds the threshold value 1. Accordingly, the control unit selects the interpolation process method not using a motion vector as the interpolation process method and transmits the interpolation process switching signal to the video interpolation unit 2. Furthermore, at time t4, the judgment parameter value becomes smaller than the threshold value 1. Accordingly, the control unit 7 selects the interpolation process method using a motion vector as the interpolation process method and transmits the interpolation process switching signal to the video interpolation unit 2. Hereinafter, the judgment parameter does not increase or decrease to cross the level of the threshold value 1 and no switching of the interpolation process method occurs.

Here, in the interpolation process method transition 62 in FIG. 6, no limit period is set for the switching control. For this, for example, the switching process occurs even in a short period of time such as from time t2 to time t3. When the switching process occurs frequently in a short period of time, a user may recognize that the output video after the frame rate conversion process has an unnatural motion.

In order to improve this phenomenon, the control unit 7 sets a predetermined limit period for the switching. This will be explained in time series by using the judgment parameter transition 61 and the interpolation process method transition 63 in FIG. 6. Firstly, from time t0 to time t1, the judgment parameter value is smaller than the threshold value 1. Accordingly, the control unit 7 selects the interpolation process method using a motion vector as the interpolation process method. Next, at time t1, the judgment parameter value exceeds the threshold value 1. Accordingly, the control unit 7 selects the interpolation process method not using a motion vector as the interpolation process method and transmits the interpolation process switching signal to the video interpolation unit 2. Here, the control unit 7 suspends the transmission of the next interpolation process switching signal until the switching limit period 64 has elapsed from the time t1 when the interpolation process switching signal has been transmitted. The switching limit period 64 is, for example, acquired from the judgment reference information 30. For example, if "1 sec" in the limit period 1 in row 33 of the judgment reference information 30 is used, no switching of the interpolation process method is performed for 1 second after the interpolation process method switching has occurred. Accordingly, in this case, in FIG. 6, the judgment parameter value is smaller than the threshold value 1 during a period from time t2 to t3 and during a period from time t4 to time 5. However, both of the periods are contained in the switching limit period 64 from time t1 and no switching of the interpolation process method is performed in these periods. At time t5 when the switching limit period 64 terminates, the judgment parameter value is smaller than the threshold value 1. Accordingly, the control unit 7 selects the interpolation process method using a motion vector as the interpolation process method and transmits the interpolation process switching signal to the video interpolation unit 2.

As has been described above, by setting a switching limit period in the switching judgment process of the interpolation process method, it is possible to limit the switching of the interpolation process method in a predetermined period. Thus, for example, even when the judgment parameter value changes to cross the level of the threshold value 1 by plurality of times within a short period of time, it is possible to prevent frequent occurrence of the switching process of the interpolation process method in a short period of time. Thus, it is possible to obtain an output video after the frame rate conversion process as a video of a natural motion.

Next, explanation will be given on the case using the judgment period 65 instead of the switching limit period. The aforementioned switching limit period 64 is a period during which no next interpolation switching process is performed after an interpolation process method switching process has occurred. On the other hand, during the judgment period 65, no interpolation process method switching process is performed at the time satisfying the judgment reference stored in the judgment reference information 30. The judgment period 65 is a period for performing the interpolation process method switching process when the state that the judgment reference is satisfied has continued for a predetermined period of time after a certain moment.

By using the judgment parameter transition 61 and the interpolation process method transition 63 in FIG. 6, explanation will be given on the application example of the judgment period through comparison between the process from time t4 and the process from time t2. Moreover, for simplifying the explanation, it is assumed that the switching limit period 64 for the transition 63 of the interpolation process method is absent. In FIG. 6, it is assumed that the switching process of the interpolation method using the judgment period 65 also ends in the same result as the transition 63 of the interpolation process method.

Firstly, explanation will be given on the process from time t4. At time t4, the judgment parameter value becomes smaller than the threshold value 1. However, at this moment, the control unit 7 does not transmit the interpolation process switching signal. Next, at time t4 when the judgment period 65 has elapsed, the control unit 7 makes a judgment as follows. That is, judgment is made whether the judgment parameter value has satisfied the judgment reference during the judgment period 65. In other words, judgment is made whether the judgment parameter value was smaller than the threshold value 1 during the time from time t4 to time t5. In FIG. 6, this reference is satisfied and at time t5, the control unit 7 selects the interpolation process method using a motion vector as the interpolation process method and transmits the interpolation process switching signal to the video interpolation unit 2.

Next, explanation will be given on the process performed from time t2. Here, it is assumed that the period from time t2 to t3 is shorter than the judgment period 65. Firstly, at time t2, the judgment parameter value becomes smaller than the threshold value 1. At this moment, the control unit 7 does not transmit the interpolation process switching signal. Next at time t3, the judgment parameter becomes greater than 1. Here, the interpolation process method has been set to the interpolation process method not using a motion vector and the control unit 7 does not transmit the interpolation process switching signal. Here, the period from time t2 to t3 is shorter than the judgment period 65. Accordingly, at time t3 before the judgment period 65 has elapsed after the time t2, the state that the judgment parameter value satisfies the judgment reference is terminated. For this, no interpolation process method switching process has been performed.

Accordingly, even when the judgment period 65 is used, like in the case using the switching limit period, for example, when the judgment parameter value crosses the level of the threshold value 1 by a plurality of times during the period from time t2 time t3, it is possible to prevent frequent occurrence of the interpolation process method switching process. Thus, it is possible to obtain an output video of a natural motion after the frame rate conversion process.

It should be noted that like the switching limit period 54, the judgment period may be acquired, for example, from the judgment reference information 30 stored in the storage unit 8 by the control unit 7. For example, it is possible to use the value of "0.3 sec" of "the judgment period 1" in row 34 of the judgment reference information 30 in FIG. 3.

Moreover, a method other than the use of the aforementioned switching limit period 64 or the judgment period 65 may be used to obtain the same advantage. That is, it is possible to modify the threshold value used for the switching judgment process between a case when the judgment parameter value is increasing and a case when the judgment parameter value is decreasing.

That is, as shown in FIG. 6, a threshold value 2 can be used in addition to the threshold value 1. For example, the threshold value 2 is stored in row 35 of the judgment reference information 30 shown in FIG. 3.

Here, if the judgment parameter value is increasing, the control unit 7 uses the threshold value 1 for the switching judgment process. Moreover, for example, if the judgment parameter value is decreasing, the control unit 7 uses the threshold value 2 for the switching judgment process. That is, in the switching judgment process by the control unit 7, a hysteresis is provided for the judgment parameter value.

Explanation will be given on a case using a plurality of threshold values by using the judgment parameter transition 61 and the interpolation process method transition 63 in FIG. 6. Moreover, for simplifying the explanation, it is assumed that the switching limit period 64 and the judgment period 65 do not exist for the interpolation process method transition 63. Even when a plurality of threshold values are used, it is assumed that the result of the interpolation process method transition 63 of FIG. 6 is obtained.

Firstly, during the period from t0 to time t1, the judgment parameter is increasing. Accordingly, the control unit does not perform the switching process. Next, at time t1 when the judgment parameter value reaches the threshold value 1, the control unit 7 selects the interpolation process method not using a motion vector as the interpolation process method and transmits the interpolation process switching signal to the video interpolation unit 2. Moreover, at time t2, the judgment parameter is decreasing. That is, the judgement parameter value has reached the threshold value 1 but not reached the threshold value 2 and accordingly, the control unit 7 does not perform the switching process. Moreover, at time t2, the judgment parameter value is increasing. Accordingly, the control unit 7 uses the threshold value 1. However, the interpolation process method has been already set to the interpolation process method not using a motion vector and the control unit 7 does not perform the switching process. Next, at time t4 and after, the judgment parameter value is decreasing and the control unit 7 uses the threshold value 2. Accordingly, the control unit 7 does not perform the switching process at time t4. Next, at time t5, the control unit 7 selects the interpolation process method using a motion vector as the interpolation process method and transmits the interpolation process switching signal to the video interpolation unit 2.

As has been described above, when a plurality of threshold values are used, it is possible to obtain an advantage similar to that when using the switching limit period 64 or the judgment period 65. That is, for example, even when the judgment parameter value crosses the level of threshold value 1 by a plurality of times within a short period of time like a period from time t2 to time t3, it is possible to prevent frequent occurrence of the switching process of the interpolation process method in a short period of time. Thus, it is possible to obtain the output video after the frame rate conversion as a video of a natural motion.

By using any one of the aforementioned interpolation process switching judgment processes, it is possible to prevent frequent occurrence of the interpolation process method switching process in a short period of time and to obtain the output video after the frame rate conversion as a video of a natural motion.

Thus, according to the second embodiment of the present invention, it is possible to reduce the calculation process amount in the frame rate conversion process while suppressing lowering of the image quality of the video and to prevent the video after the frame rate conversion from becoming a video of an unnatural motion.

[Embodiment 3]

Next, explanation will be given on a third embodiment of the present invention with reference to the drawings. A frame rate conversion apparatus according to the third embodiment is identical to the frame rate conversion apparatus of the first or the second embodiment except for that other judgment reference information is used in the switching judgment process by the control unit 7.

For example, the control unit 7 in the third embodiment uses a judgment condition of row 30 stored in the judgment reference information 30 shown in FIG. 3. The data stored in row 36 of the judgment reference information 30 has a data name "acquired signal 1", a data type "acquired signal condition", and a data content "signal B contained".

The control unit 7 uses the data stored in row 36 as the judgment reference. In this case, for example, the control unit 7 judges whether the input signal inputted to the input unit 1 of FIG. 2 contains "signal B". If the input signal does not contain "signal B", the control unit 7 performs control so that the interpolation process method of the video interpolation unit 2 is the interpolation method using a motion vector. Next, if the input signal contains "signal B", the control unit 7 transmits an interpolation process switching signal so that the interpolation process method of the video interpolation unit 2 is the interpolation method not using a motion vector.

By using the aforementioned judgment reference, for example, it is possible to detect a signal indicating a scene change contained in the input video signal and modify the interpolation process method. For example, this can be applied to a case when it is inappropriate to use the interpolation process using a motion vector such as at a scene change.

As for the signal used as the judgment reference in the acquired signal condition, for example, the input video signal may include a particular signal for performing the judgment process of the present embodiment. Alternatively, it is possible to use a signal contained in the existing input video signal as the judgment reference.

Moreover, for example, it is also possible to use as the judgment reference, a combination of the judgment reference condition of the signal contained in the input video signal like data stored in row 37 in the judgment reference information 30 in FIG. 3 and a condition of threshold value data using the number of motion vectors. In this case, it is possible to change the threshold value serving as the judgment reference for the switching process of the interpolation process method in accordance with the signal contained in the input video signal.

Moreover, for example, the control unit 7 may change the respective threshold values stored in the judgment reference information 30 in accordance with the signal contained in the input video signal. In this case, there is no need of preparing a plurality of threshold values in the judgment reference information 30 in advance. Moreover, it is possible to set a threshold value having a further detailed correspondence with the signal contained in the input video signal as the judgment reference. For example, the threshold value may be a function having the numeric data contained in a signal contained in the input video signal as a variable.

Thus, according to the aforementioned third embodiment, it is possible to reduce the calculation process amount in the frame rate conversion process while suppressing lowering of an image quality of the video and to prevent execution of an inappropriate interpolation process for the frame rate conversion process.

[Embodiment 4]

Next, explanation will be given on a fourth embodiment of the present invention with reference to the attached drawings. A frame rate conversion apparatus according to the fourth embodiment is identical to the frame rate conversion apparatus of the first to the third embodiment except for that an independent interpolation process method is executed in a plurality of regions in the frame.

Figure 7:
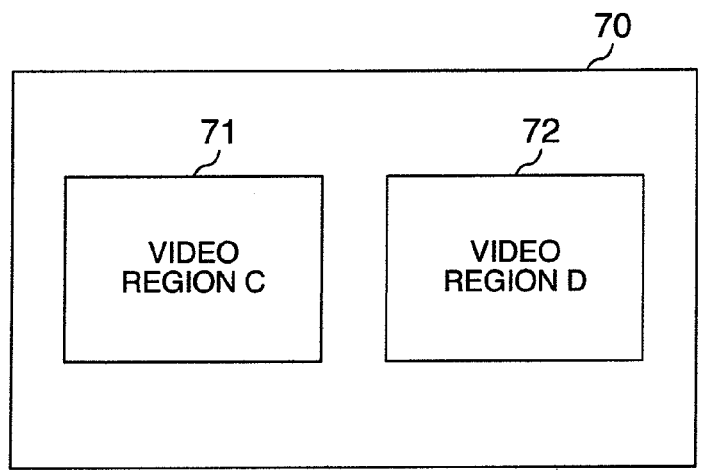
FIG. 7 explains an example of a video frame according to an embodiment of the present invention.

FIG. 7 shows an example of output video of the frame rate conversion apparatus according to the fourth embodiment.

The fourth embodiment is used, for example, in a case when different videos are to be displayed in two video regions C71 and D72 in one video frame 70. The control unit 7 of the frame rate conversion apparatus of the fourth embodiment performs a judgment process using judgment reference information in the video region C71 and the video region D72. Moreover, according to the judgment process result, an interpolation process method switching method for each of the regions is transmitted to the video interpolation unit 2. Here, the video interpolation unit 2 performs switching between the interpolation process methods for each of the regions.

Here, the judgment reference information may be shared by the switching judgment process of the interpolation process method in the video region C71 and the switching judgment process of the interpolation process method in the video region D72. Moreover, the judgment reference information corresponding to the respective regions may be generated by the control unit 7 and stored in the storage unit 8 so that they are used in the switching judgment process of each of the regions.

In this embodiment, an independent interpolation process is executed in each of the two video regions C71 and D72 in the video frame 70. In this case, for example, when displaying a video having comparatively little motion in the video region C71 and a video having an intensive motion exceeding a motion vector search region in the video region D72, it is possible to use the interpolation method using a motion vector in the video region C71 and the interpolation process method based on the linear interpolation not using a motion vector in the video region D72. Thus, it is possible to perform the frame rate conversion by using different interpolation processes in the respective regions.

Explanation has been given on the case of two regions in a video frame. However, the present embodiment is not limited to two regions but can be applied to a case of more regions.

The aforementioned information on the region positions of a plurality of different regions having different image motions in the same frame may be set in advance and stored in the storage unit 8. Moreover, the motion vector calculated by the motion vector search unit 4 and stored in the storage unit 8 may be statistically evaluated by the control unit 7 so as to decide the range of each region.

According to the fourth embodiment thus far explained, even for the input video including a plurality of regions having different image motions in the same frame, it is possible to reduce the calculation process amount in the frame rate conversion process while suppressing lowering of the image quality of the video.

[Embodiment 5]

Next, explanation will be given on a fifth embodiment of the present invention. A display apparatus according to the fifth embodiment includes the frame rate conversion apparatus according to the first to the fourth embodiment as a frame conversion unit.

Figure 8:
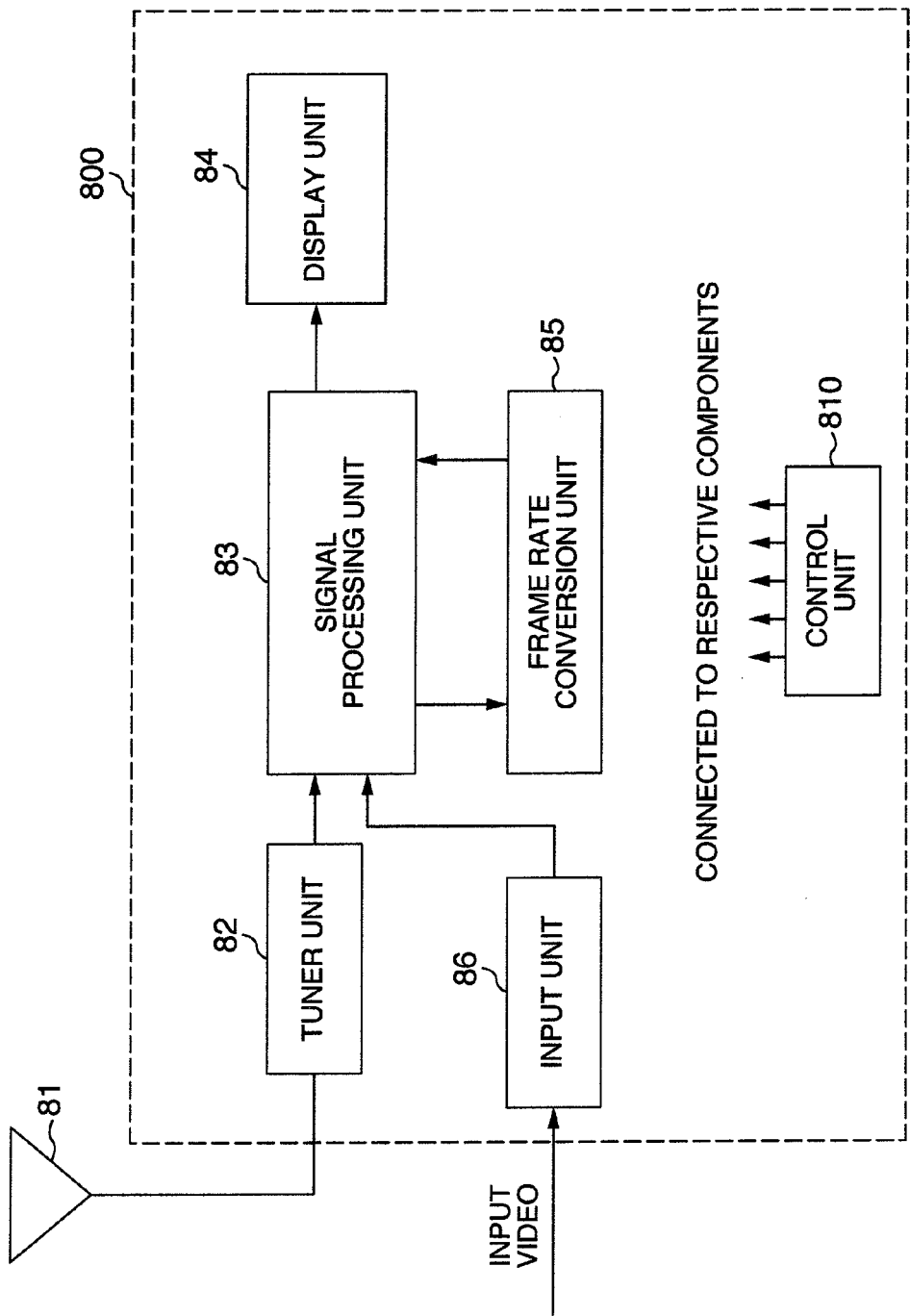
FIG. 8 is a block diagram showing an example of a display apparatus according to an embodiment of the present invention.

FIG. 8 is a block diagram showing an example of the display apparatus 800 according to the fifth embodiment. The display apparatus 800 includes, for example, an antenna 81, a tuner unit 82, a signal processing unit 83, a display unit 84, a frame conversion unit 85, an input unit 86, and a control unit 810.

It should be noted that operations of the respective components of the display apparatus 800 explained below may be autonomous operations of the respective components or may be controlled by the control unit 810 connected to the respective components. This can be realized by cooperation of the control unit 810 with software.

Here, the antenna 81 receives a radio wave from outside and sends the received radio wave to the tuner unit 82. The tuner unit 82 converts the radio wave received from the antenna 81 into a video signal and sends the converted video signal to the signal processing unit 83. The signal processing unit 83 subjects the video signal acquired from the tuner unit 82 to a signal process and sends the signal-processed video signal to the display unit 84. The display unit 84 displays the video signal acquired from the signal processing unit 83.

Here, the radio wave received by the antenna 81 may be, for example, a TV broadcast wave.

Here, the control unit 810 sends a control signal to the signal processing unit 83 or the frame rate conversion unit 85 so as to control the signal processing unit 83 and the frame rate conversion unit 85 to perform the frame rate conversion process on the video signal received from the tuner unit 82.

Here, the signal processing unit 83 which has acquired the control signal from the control unit 810 sends the video signal received from the tuner unit or the video signal subjected to signal processing by the signal processing unit 83 to the frame rate conversion unit 85. Next, the frame rate conversion unit 85 which has acquired the video signal from the signal processing unit 83 executes the frame rate conversion process identical to the one performed by the frame rate conversion apparatus according to the first to the fourth embodiment or a frame rate conversion process based on a combination of the processes. Next, the frame rate conversion unit 85 sends the video signal subjected to the frame rate conversion process to the signal processing unit 83. Next, the video signal acquired by the signal processing unit 83 from the frame rate conversion unit 85 or the video signal obtained by subjecting the video signal to a signal process is outputted to the display unit 84. The display unit 84 displays the video signal acquired from the signal processing unit 83.

Here, in the frame rate conversion process performed by the frame rate conversion unit 85, the same interpolation process switching judgment process as in the first to the fourth embodiment is performed. Here, the judgment reference information used in the switching judgment process may be stored in advance in the storage unit held by the frame rate conversion unit 85. Moreover, the control unit 810 may control the judgment reference information by setting and modifying it.

Moreover, in FIG. 8, the frame rate conversion unit 85 is depicted as a different block from the signal processing unit 83 but these may be included in the same circuit.

Moreover, in the above-given explanation, the display apparatus 800 in FIG. 8 acquires a video signal as the radio wave received by the antenna 81. However, instead of using the antenna 81 and the tuner unit 82 to acquire the video signal, the display apparatus 800 may acquire the video signal from the input unit 86 depicted. Here, for example, the input unit 86 may be an input unit having a LAN connector connected to a network or an input unit having a USB connector. Furthermore, the input unit may have a terminal for digital-inputting a video signal and an audio signal or may have an analog input terminal such as a composite terminal and a component terminal. In any one of the cases, the signal processing unit 83 can acquire a video.

Moreover, when the input unit 86 is connected to a network such as the Internet via the aforementioned terminals, for example, it is possible to acquire a video signal such as the Internet broadcast.

Moreover, the display apparatus 800 may be, for example, a plasma television, a liquid crystal television, or a CRT television, or a projector, or an apparatus using other apparatus. Similarly, the display unit 84 may be, for example, a plasma panel module, an LCD module, or a projector apparatus.

Accordingly, the display apparatus 800 according to the present embodiment can realize a display apparatus for performing the frame conversion process of the first to the fourth embodiment on the acquired video signal and displaying it.

Consequently, in the fifth embodiment of the present invention, it is possible to realize a display apparatus capable of reducing the calculation process amount in the frame conversion process while suppressing lowering of the image quality of the video.

[Embodiment 6]

Next, explanation will be given on a sixth embodiment of the present invention with reference to the attached drawings. A display apparatus according to the sixth embodiment is a recording apparatus including the frame rate conversion apparatus according to the first to the fourth embodiment as a frame conversion unit.

Figure 9:
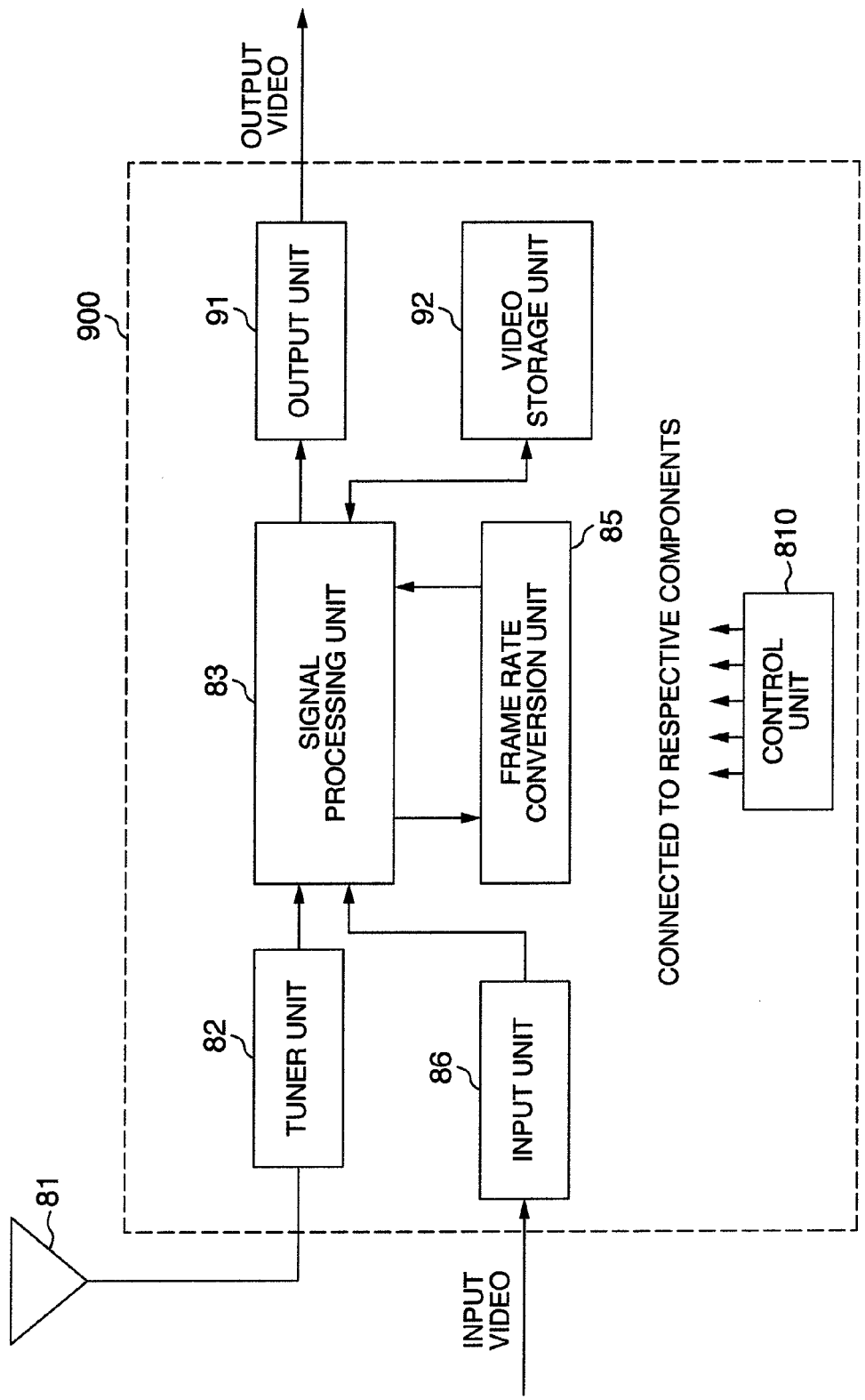
FIG. 9 is a block diagram showing an example of a recording apparatus according to an embodiment of the present invention.

FIG. 9 is a block diagram showing an example of the recording apparatus 900 according to the sixth embodiment. The recording apparatus 900 includes, for example, an antenna 81, a tuner unit 82, a signal processing unit 83, a frame rate conversion unit 85, an input unit 86, an output unit 91, a video storage unit 92, and a control unit 810. That is, the video recording apparatus 900 is identical to the display apparatus 800 of the fifth embodiment except for that instead of the display unit 84, the output unit 91 and the video storage unit 92 are provided. Accordingly, the functions and the operations of the antenna 81, the tuner unit 81, the signal processing unit 83, the frame rate conversion unit 85, and the input unit 86 are almost identical to those of the fifth embodiment. Hereinafter, explanation will given on the only the points different from the fifth embodiment.

It should be noted that the operations of the respective components of the recording apparatus 900 described below may be autonomous operations of the respective components or may be controlled by the control unit 810 connected to the respective components, or may be realized in cooperation between the control unit 810 and software.

The output unit 91 outputs a video signal acquired from the signal processing unit 83, for example, to other display apparatus connected to the output unit 91. Here, the output unit 91, for example, may include a terminal for digital-outputting a video signal or may include a terminal for analog-outputting such as a composite terminal and a component terminal. Alternatively, the output unit 91 may include a LAN connector for connection to the network or a USB connector. Furthermore, the output unit 91 may be a transmission unit for transferring data by a wireless way.

The video storage unit 92 records a video signal acquired from the signal processing unit 83. Moreover, the recorded video signal is outputted to the signal processing unit 83. Here, the video storage unit 92 may be, for example, a hard disc drive or a flash memory, or a removable media disc drive. Moreover, the video storage unit 92 may be an apparatus for recording a signal on a mobile medium.

Here, the signal processing unit 83 performs video I/O operation to/from the video storage unit 92 in addition to the functions and operations explained in the fifth embodiment. Here, the video signal inputted to the video storage unit 92 by the signal processing unit 83, for example, may be a video signal which has been subjected to the frame conversion process in the frame conversion unit 85. Moreover, the video signal may be a signal not subjected to the frame rate conversion process. Moreover, the signal processing unit 83 may output the video signal acquired from the video storage unit 92 after subjecting it to the frame rate conversion process in the frame rate conversion unit 85. Moreover, it is possible to output a video signal not subjected to the frame rate conversion process to the output unit 91.

Accordingly, in the recording apparatus 900, the frame conversion unit 85 can perform an appropriate frame rate conversion process on the video signal acquired from the antenna 81 or the input unit 86 and the video storage unit 92 can store the video signal after the frame rate conversion process.

Moreover, in the recording apparatus 900, the frame rate conversion unit 85 can perform an appropriate frame rate conversion process on the video signal to be stored in the video storage unit 92 and the video signal after the frame rate conversion process can be outputted from the output unit 91.

Moreover, the recording apparatus 900, for example, may be an HDD recorder, a DVD recorder, or a recording apparatus using other storage apparatus.

Accordingly, in the recording apparatus 900 according to the present embodiment, it is possible to realize a recording apparatus for performing the frame rate conversion process according to the first to the fourth embodiment on the acquired video signal and recording the signal.

Consequently, according to the fifth embodiment of the present invention, it is possible to realize a recording apparatus capable of reducing the calculation process amount in the frame rate conversion process while suppressing lowering of the video image quality.

Referring to FIGS. 10A, 10B and FIG. 11, explanation will be given on an example of an input video or an output video obtained by the frame rate conversion apparatus, the display apparatus, or the recording apparatus according to the aforementioned embodiments of the present invention.

FIGS. 10A and 10B show an example of an input video or an output video obtained by the frame rate conversion apparatus, the display apparatus, or the recording apparatus according to the embodiments of the present invention. FIG. 10A shows an interpolation process method using a motion vector. FIG. 10B shows an interpolation process using a motion vector. Moreover, in the each of the figures, the upper part shows an image of the preceding frame, an intermediate part shows an image of the interpolation frame, and a lower part shows an image of the subsequent frame. Here, a preceding frame 1001 and a preceding frame 1004 are identical to the preceding frame 21 in FIG. 2. Moreover, an interpolation frame 1002 and in interpolation frame 1005 are identical to the interpolation frame 22 in FIG. 2. Moreover, a subsequent frame 1003 and a subsequent frame 1006 are identical to the subsequent frame 23 in FIG. 2. Moreover, it is assumed that the spatial pixel position in each frame in the respective figures shows the same portion. In each of the figures, for example, it is assumed that the described values indicate pixel values of an image. For example, a portion having no value description has a pixel value 0.

Moreover, it is assumed that the input video signal includes a preceding frame and a subsequent frame. Moreover, it is assumed that the input video signal after being subjected to the frame rate conversion process includes an interpolation frame in addition to the preceding frame and the subsequent frame.

Moreover, in FIG. 10A and FIG. 10B, for example, it is assumed that the input video signals are identical. That is, the image of the preceding frame and the image of the subsequent frame are identical.

Here, the frame 1001 of the preceding frame and the image 1004 of the preceding frame are images where pixels of the pixel value W are arranged in the shape of character "A". The center position of the character "A" in the horizontal direction is assumed to be the position E.

Next, the subsequent frame image 1003 and the subsequent frame image 1006 are both images where the pixels of the pixel value W are arranged in the shape of the character "A" but the center position of the image of the character "A" in the horizontal direction is changed to the position F.

Accordingly, in FIG. 10A and FIG. 10B, the images contained in the input video signal, for example, are images where the image of the character "A" moves from the position E in the preceding frame to the position F in the subsequent frame. For this, for example, if the motion vector search unit 4 shown in FIG. 1 performs a motion vector search, it is possible to obtain a motion vector 1007 as is depicted. Here, the motion vector 1007 has a vector amount G and the rightward direction.

By using the image 1002 and the image 1005, explanation will be given on the interpolation frame image obtained when the aforementioned input video signal is inputted to the frame rate conversion apparatus, the display apparatus, or the recording apparatus according to the respective embodiments of the present invention.

Firstly, the image 1002 is an image when an interpolation frame is generated by the interpolation process method using a motion vector. For example, the interpolation frame is generated by the method shown in FIG. 2C by the video interpolation unit 2 in FIG. 1. In this case, the video interpolation unit 2, for example, generates an interpolation frame image by using the motion vector 1007 acquired by the motion vector search unit 4. Accordingly, if the motion vector search unit 4 has not caused a motion vector search mistake, the image of the character "A" is shifted from the position E by a distance and direction of the motion vector 1008 in the interpolation frame image. Here, the motion vector 1008 is a vector having the same direction as the motion vector 1007 and a vector amount H smaller than the vector amount G.

The ratio of the vector amount G against the vector amount H may be generated, for example, so as to satisfy the following expression (2) in the case of FIG. 2C.

$$\frac{H}{G} = \frac{\alpha}{\alpha + \beta} \qquad (2)$$

However, the vector amount H only should be smaller than the vector amount G and may not satisfy the Expression (2).

Next, the image 1005 is an image when the interpolation frame is generated by the interpolation process method not using a motion vector. For example, the interpolation frame image is generated by the video interpolation unit 2 in FIG. 1 without using the motion vector 1007 acquired by the motion vector search unit 4. The figure shows a case when the interpolation frame is generated by using a linear interpolation as an example. That is, for example, the video interpolation unit 2 generates the interpolation frame by the method shown in FIG. 2B.

Here, the image 1005 shows a plurality of images each formed by pixels arranged in the shape of the character "A". In this example, an image formed by pixels of pixel value M arranged in the shape of "A" is present at the position E and another image formed by pixels of pixel value N arranged in the shape of "A" is present at the position F. Here, in the case of the linear interpolation shown in FIG. 2B, the pixel value M and the pixel value N, for example, may be calculated by Expression (3) and Expression (4), respectively.

$$M = W \times \frac{\beta}{\alpha + \beta} \qquad (3)$$

$$N = W \times \frac{\alpha}{\alpha + \beta} \qquad (4)$$

However, the pixel value M and the pixel value N should not be greater than the pixel value W and need not satisfy the Expression (3) and the Expression (4).

Moreover, the image 1005 shows a case that images arranged in the shape of the character "A" are not overlapped.

Here, if the images are overlapped, the pixel value of the pixels of the overlapped portion may be, for example M+N. Moreover, the pixel value of the pixels at the overlapped portion may be one of M and N which is greater than the other.

As has been described above, by inputting an input video signal including the image of the preceding frame and the subsequent frame shown in FIG. 10A and FIG. 10B into the frame rate conversion apparatus or the like, according to output video image or the interpolation frame image included in the output video image, it is possible to judge whether the interpolation method using a motion vector or the interpolation method not using a motion vector has been used.

Next, FIG. 11 shows a method for using the input video signal and the output video or the output video signal explained in FIGS. 10A and 10B to check the switching control of the interpolation process performed by the frame rate conversion apparatus, the display apparatus, or the recording apparatus according to the respective embodiments of the present invention.

FIG. 11 shows four graphs. The uppermost graph shows a transition 1101 of the vector amount G of the input video signal used for checking the switching control in FIG. 11. Here, the input video signal is the input video signal including the images of the preceding frame and the subsequent frame explained in FIGS. 10A and 10B. Accordingly, the vector amount G, for example, is a speed at which the shape of the character "A" shifts between the frames in FIG. 10A and FIG. 10B.

Moreover, below the graph of the transition 1101 of the vector amount G, three different types of switching control of the interpolation process method are shown: a transition 1102 of the interpolation process method, a transition 1103 of the interpolation process method, and a transition 1104 of the interpolation process method. Hereinafter, explanation will be given on the relationship between the respective interpolation process methods and the transition 1101 of the vector amount G.

Firstly, the interpolation process method transition 1102 shows a case when no switching control of the interpolation process method is performed. In this case, like the transition 1101, even when the vector amount G of the vector in the input signal is increased to the vector amount G3 like arrow 1105 from time t1, no switching of the interpolation process method occurs. Here, in order to check that no switching of the interpolation process methods occurs, for example, the vector amount G3 should be increased as much as possible.

Next, explanation will be given on the interpolation process method transition 1103 showing that the interpolation process method switching control is performed. Here, in case of FIG. 11, while the vector amount G is between 0 to G2, the interpolation process method using a motion vector is used. Next, it is assumed that at the moment of time t1 when the vector amount G is increased, the interpolation frame included in the output video, for example, is switched from the interpolation frame 1102 of FIG. 10A to the interpolation frame 1005 of FIG. 10B. In this case, the interpolation process method is switched from the interpolation process method using a motion vector to the interpolation process not using a motion vector. Next, the vector amount is increased to G3 and then decreased like arrow 1106. Here, suppose that at time t4 when the vector amount G has become G2, the interpolation frame included in the output video is switched, for example, from the interpolation frame 1005 of FIG. 10 B to the interpolation frame 1002 of FIG. 10A. In this case, the interpolation process method is switched from the interpolation process not using a motion vector to the interpolation process method using a motion vector.

In the case when the interpolation process method is switched like the aforementioned interpolation process method transition 1103, the interpolation process method is switched by using a threshold value concerning the vector amount of the motion vector. For example, the same check can be performed in the frame rate conversion apparatus using the first embodiment of the present invention.

Next, the transition 1104 of the interpolation process method is also an example when switching of the interpolation process method is performed. Here, in this graph, the interpolation process transition from time t0 to time t3 is identical to the interpolation process method transition 1103. That is, at time t1, the interpolation process method using a motion vector is switched to the interpolation process not using a motion vector. Next, from time t3, the vector amount G is decreased as shown by arrow 1106. Here, unlike the interpolation process method transition 1103, in the interpolation process method transition 1104, the interpolation process method switching control occurs at time t5 when the vector amount G has become G1. For example, this interpolation process method transition is obtained when the interpolation process method switching control according to the second embodiment of the present invention is performed. The interpolation process method switching control according to the second embodiment of the present invention, as has been described above, includes a method using the switching limit period, the method using the judgment period, a method using a plurality of threshold values (method having a hysteresis), and the like. These judgment methods will be explained below.

In the transition 1101 of the vector amount G in the input video signal, the vector amount G is decreased from time t3. Assume that the decrease is started at time t3+T (T is a predetermined time) and all the times hereafter are delayed by T. That is, the transition of the vector amount G is G2 at the time t4+T, G1 at time t5+T, and 0 at time t6+T. Assume that the interpolation process method switching control occurs at time t5 like in the original transition 1101 even if an input video signal having the new transition of the vector amount G. In this case, the interpolation process method switching control is performed, for example, by using the switching limit period among the interpolation process method switching controls according to the second embodiment of the present invention. That is, the interpolation process method switching control occurs at the same time as in the original case regardless of that at all the times after time t3, the relationships between the vector amount G and the respective times are different from the original transition 1101. For example, when a switching control period having a length t4-t1 is used and the threshold value is G2, at time t1, the interpolation process method is switched from the interpolation process method using a motion vector to the interpolation process method not using a motion vector at time t1. Next, at time t4 when the period of t4-t1 has elapsed, if the vector amount G is not greater than G2, the interpolation process method is switched from the interpolation method using a motion vector to the interpolation process method not using a motion vector at time t4.

Next, explanation will be given on a similar case of the transition 1101 of the vector amount G in the input video signal where the time to start decrease of the vector amount G from G3 is delayed to t3+T (T is a predetermined amount) and all the times hereafter are delayed by T but the interpolation process method switching control occurs at time t5+T when the vector amount G has become G1.

In this case, for example, the method using the judgment period or the method using a plurality of threshold values (method having a hysteresis) is performed among the interpolation process method switching controls according to the second embodiment of the present invention.

Firstly, in the transition 1101 of the vector amount G in the input video signal, the value of the vector amount G is fixed as shown in the transition 1107 of the vector amount G immediately before time 5. Here, the value of the vector amount G is slightly greater than G1. Here, if no interpolation process method switching control occurs at time t5 and after time t5, it can be said that the interpolation process method switching control is the method using a threshold value (method having a hysteresis) according to the second embodiment. That is, in this case, when the vector amount T increases, at the threshold value G2, the interpolation process method is switched from the interpolation process method using a motion vector to the interpolation process method not using a motion vector. Next, when the vector amount G decreases, at the moment when the vector amount G has become the threshold value G1, the interpolation process method is switched from the interpolation process method not using a motion vector to the interpolation method using a motion vector.

Next, even when a switch is made to the transition 1107 of the aforementioned vector amount G, if an interpolation process method switching control occurs at time t5, the interpolation process method switching control is performed by the method using the judgment period according to the second embodiment. That is, in the case of interpolation process method switching control using G2 for the switching control threshold value and t5-t4 as the judgment period, if the vector amount G is not greater than the threshold value G2 before the moment t5 when t5-t4 has elapsed from the moment t4 when the vector amount G has decreased to the threshold value G2, the interpolation process method is switched from the interpolation process method not using a motion vector to the interpolation process method using a motion vector.

As has been described above, when the interpolation process method is switched like the transition 1104 of the interpolation process method, the interpolation process method is switched by using the threshold value concerning the vector amount of the motion vector. Moreover, the aforementioned method using the switching limit period, the method using the judgment period, or the method using a plurality of threshold values (method having a hysteresis) is performed. For example, the similar check can be performed in the frame rate conversion apparatus using the second embodiment of the present invention.

Thus, by using the check method explained with reference to FIG. 11, it is possible to input a predetermined input video signal to the frame rate conversion apparatus, the display apparatus, or the recording apparatus and to check an interpolation frame image in the output video or the output video signal so as to decide which interpolation process method switching process is used in the frame rate conversion process in these apparatuses.

According to the frame rate conversion apparatus, the display apparatus, or the recording apparatus according to the respective embodiments of the present invention thus far described, for example, it is possible to provide a technique for performing a frame rate conversion of a video signal at a high speed. Moreover, it is possible to provide a frame rate conversion technique for encoding dynamic image data at a high speed while preventing lowering of the image quality of the video.

It should be noted that even a combination of any of the aforementioned embodiments may be an embodiment of the present invention.

According to the frame rate conversion apparatus, the display apparatus, or the recording apparatus of the aforementioned respective embodiments, it is possible to reduce the calculation process amount in the frame rate conversion process while suppressing lowering of the image quality of the video.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A frame rate conversion apparatus for inputting a video signal, and inserting an interpolation frame into the video signal so as to convert a frame rate of the video signal, the apparatus comprising:
    a motion vector search unit, configured to search for a plurality of motion vectors between a plurality of frames contained in the video signal;
    a vector distribution calculation unit, configured to calculate the vector distribution, by setting respective start points of said plurality of motion vectors searched by the motion vector search unit as an origin point of a search range of the motion vectors, and by calculating a number of motion vectors whose end points are the pixels in the search range of the motion vectors;
    a video interpolation unit, configured to generate the interpolation frame; and
    a control unit, configured to control switching between methods of the generation process of the interpolation frame by the video interpolation unit;
    wherein the control unit makes comparison between a threshold value and a rate of the number of motion vectors whose end points are the pixels in the search range of the motion vectors calculated by the vector distribution calculation unit against a number of motion vectors whose end points are pixels in a range with a predetermined width outside of the search range of the motion vectors;
    wherein when the rate is equal to or lower than the threshold value, the control unit controls the video interpolation unit to use a method of the generation process of the interpolation frame using the motion vectors searched by the motion vector search unit; and
    wherein when the rate is higher than the threshold value, the control unit controls the video interpolation unit to use a method of the generation process of the interpolation frame without using the motion vectors search by the motion vector search unit.

* * * * *